(12) United States Patent
Stocco

(10) Patent No.: US 9,587,711 B2
(45) Date of Patent: Mar. 7, 2017

(54) ANTI-BACKLASH GEAR

(71) Applicant: Leo James Stocco, Vancouver (CA)

(72) Inventor: Leo James Stocco, Vancouver (CA)

(73) Assignee: ORBITLESS DRIVES INC, Vancouver, BC (CA)

( * ) Notice: Subject to any disclaimer, the term of this patent is extended or adjusted under 35 U.S.C. 154(b) by 397 days.

(21) Appl. No.: 14/153,066

(22) Filed: Jan. 12, 2014

(65) Prior Publication Data

US 2014/0196557 A1 Jul. 17, 2014

Related U.S. Application Data

(60) Provisional application No. 61/752,040, filed on Jan. 14, 2013, provisional application No. 61/752,045, filed on Jan. 14, 2013.

(51) Int. Cl.
*F16H 1/28* (2006.01)
*F16H 57/12* (2006.01)

(52) U.S. Cl.
CPC .......... *F16H 1/2863* (2013.01); *F16H 57/12* (2013.01); *Y10T 74/19623* (2015.01)

(58) Field of Classification Search
CPC ... F01D 5/187; F05D 2230/90; F05D 2230/31
See application file for complete search history.

(56) References Cited

U.S. PATENT DOCUMENTS 4,429,586 A * 2/1984 Dopfer .................... F16H 1/206
74/410

* cited by examiner

*Primary Examiner* — Richard Chang

(57) ABSTRACT

A stiff anti-backlash gear unit comprising two or more high ratio reducer assemblies provides an energy efficient, low backlash, speed reducer. The gear unit is assembled in such a way as to eliminate backlash without any preloading and may be configured as a conventional, planetary or star gear with co-axial, spaced, angled or multiple output shafts.

16 Claims, 32 Drawing Sheets

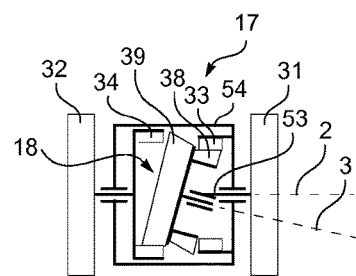
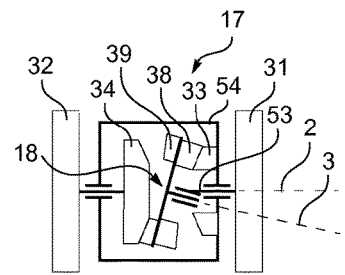
Fig. 21  Fig. 22
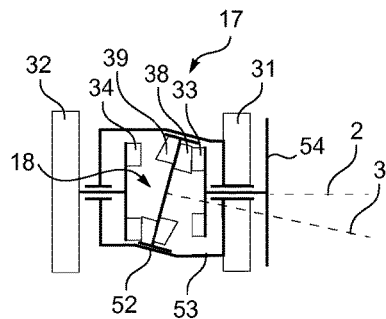
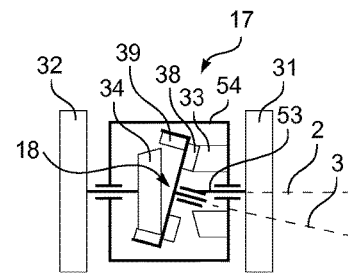
Fig. 23  Fig. 24
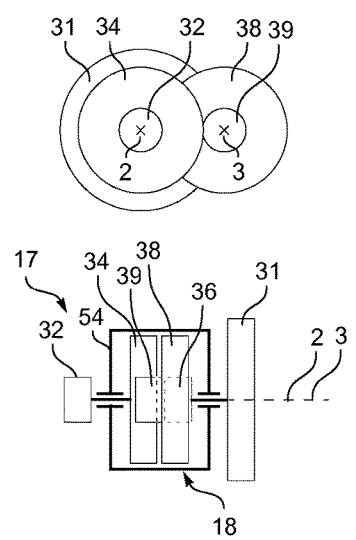
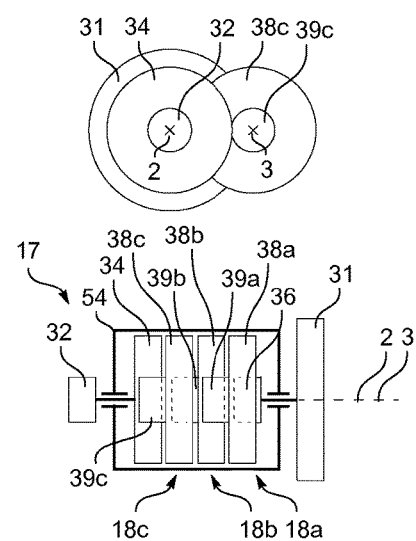
Fig. 25  Fig. 26

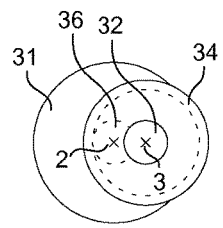
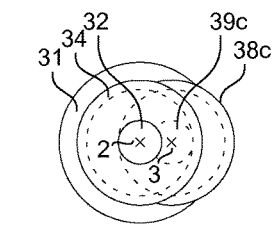
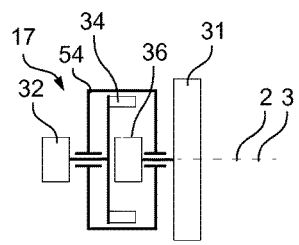
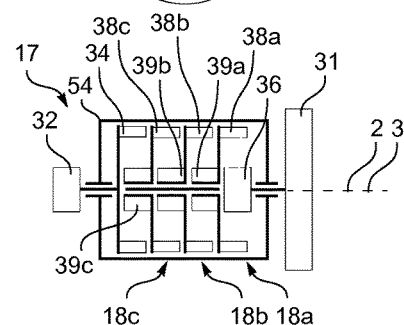
Fig. 27
Fig. 28
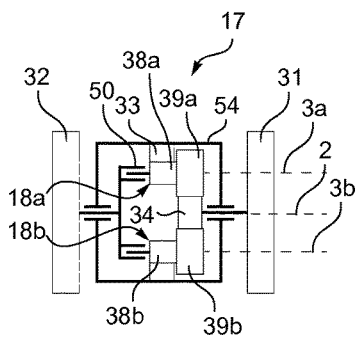
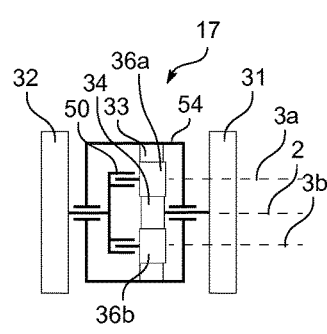
Fig. 29
Fig. 30
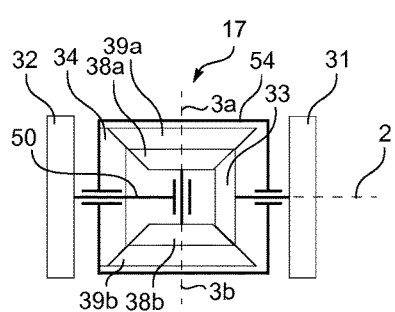
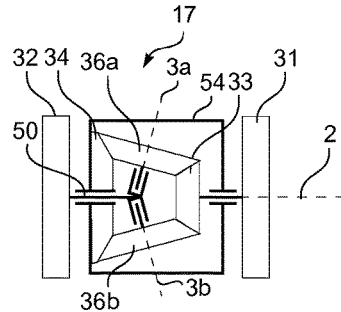
Fig. 31
Fig. 32

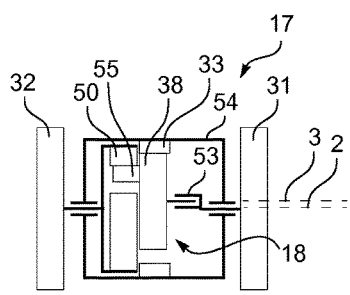
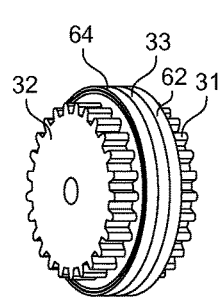
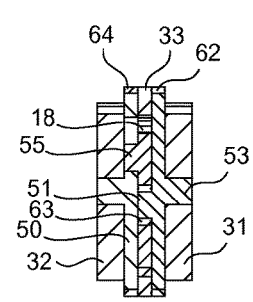
Fig. 33A     Fig. 33B     Fig. 33C
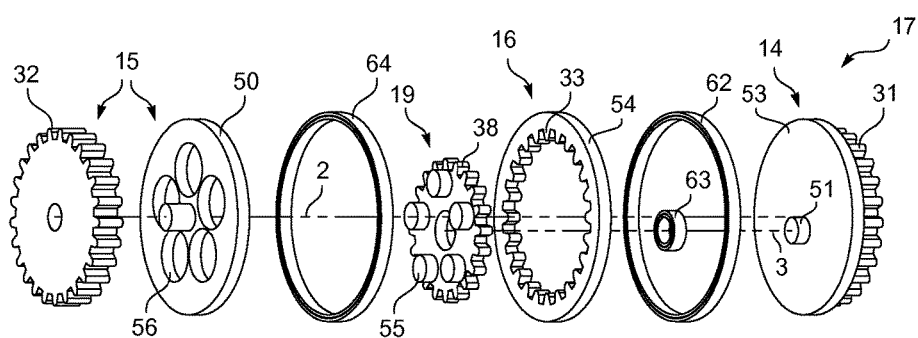
Fig. 33D

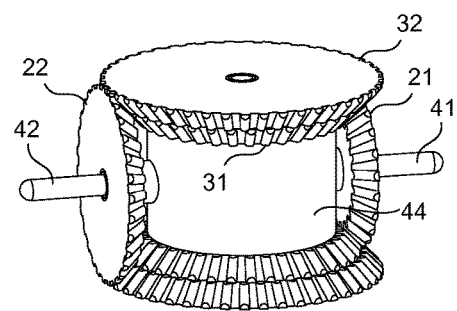
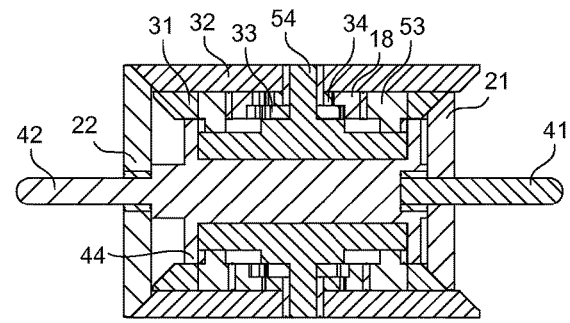
Fig. 42B            Fig. 42C
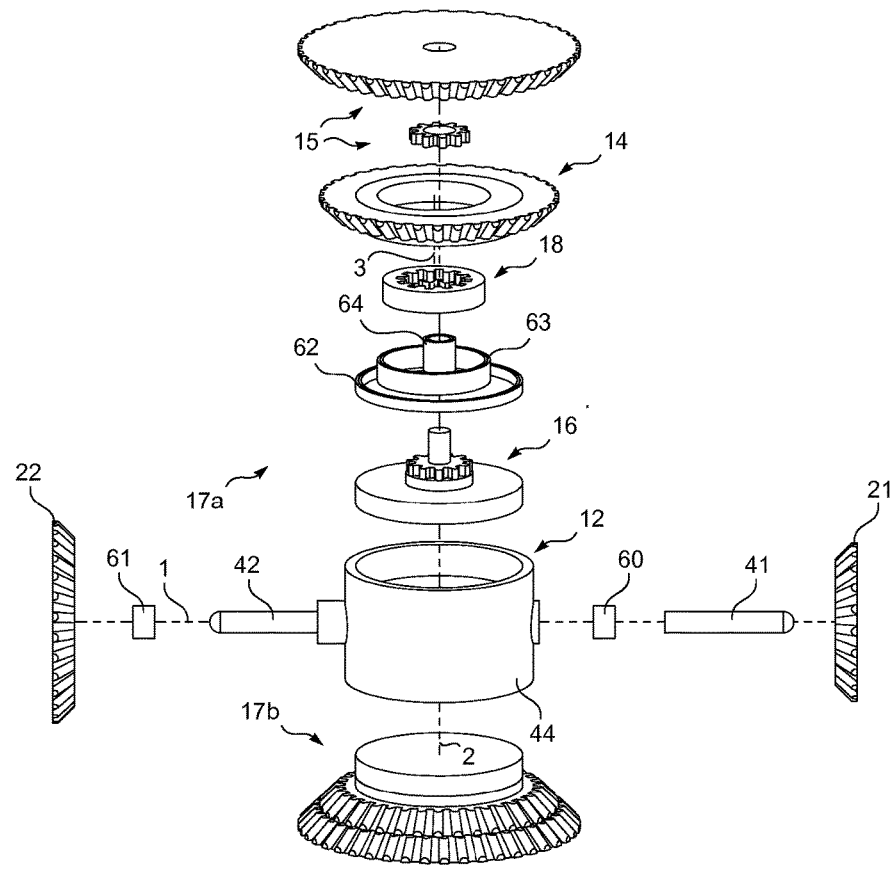
Fig. 42D

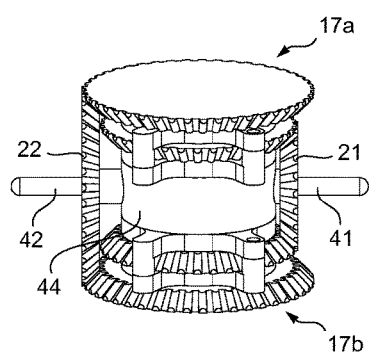
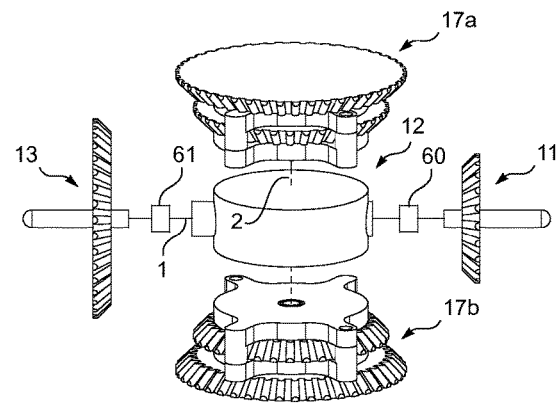
Fig. 44A    Fig. 44B
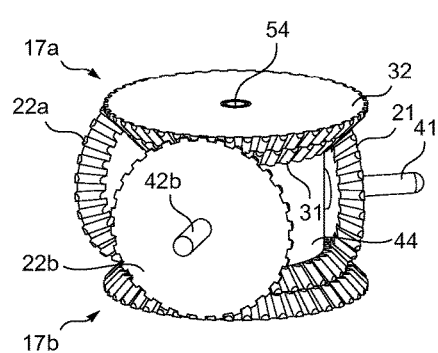
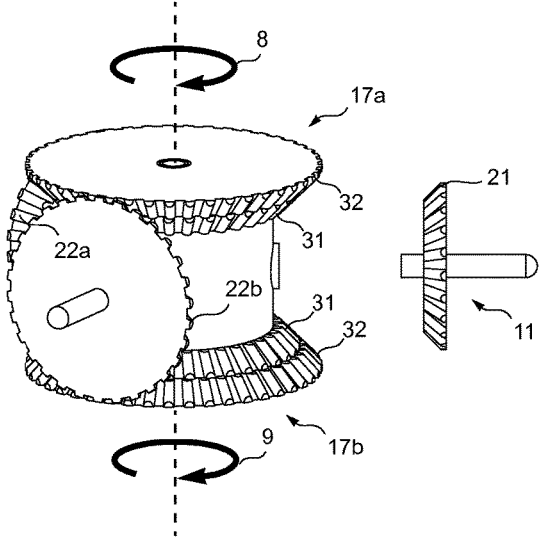
Fig. 45A    Fig. 45B

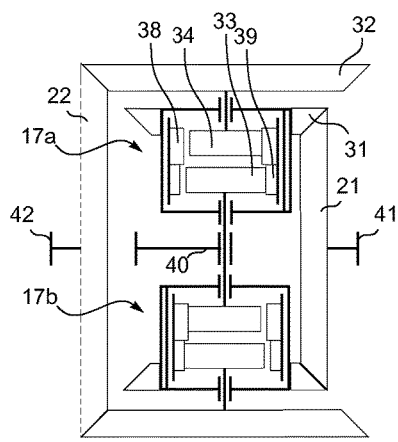
Fig. 46A
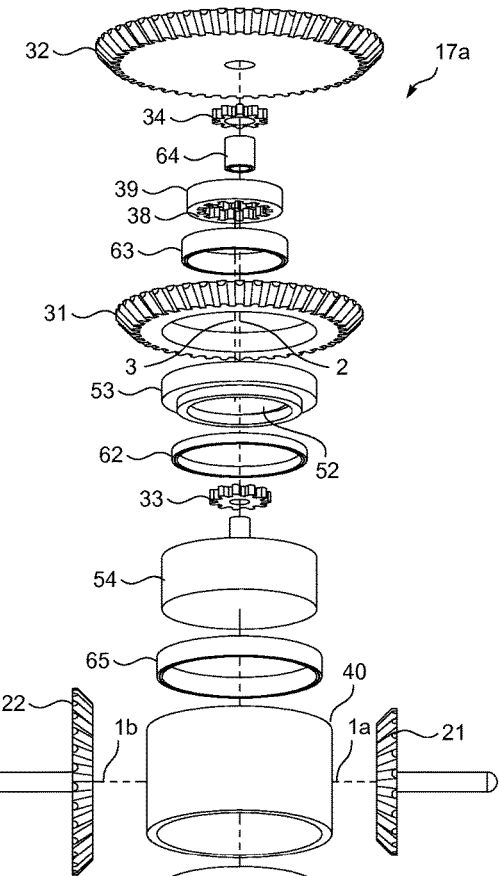
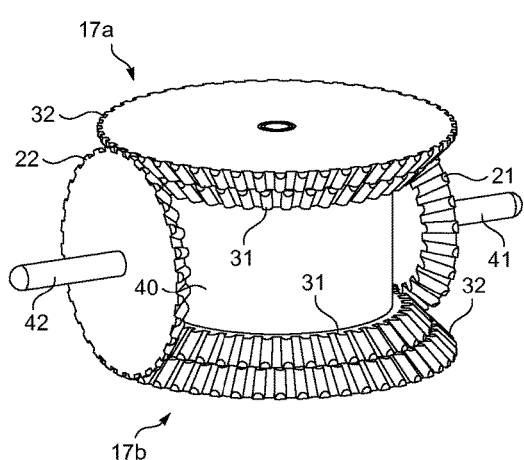
Fig. 46B
Fig. 46C

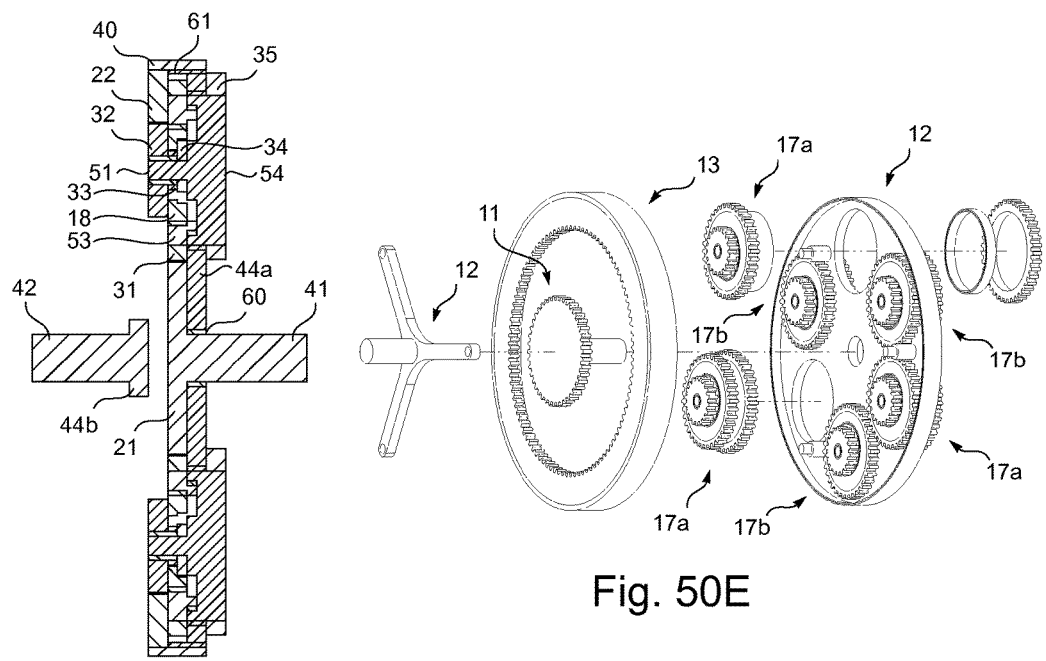
Fig. 50D
Fig. 50E
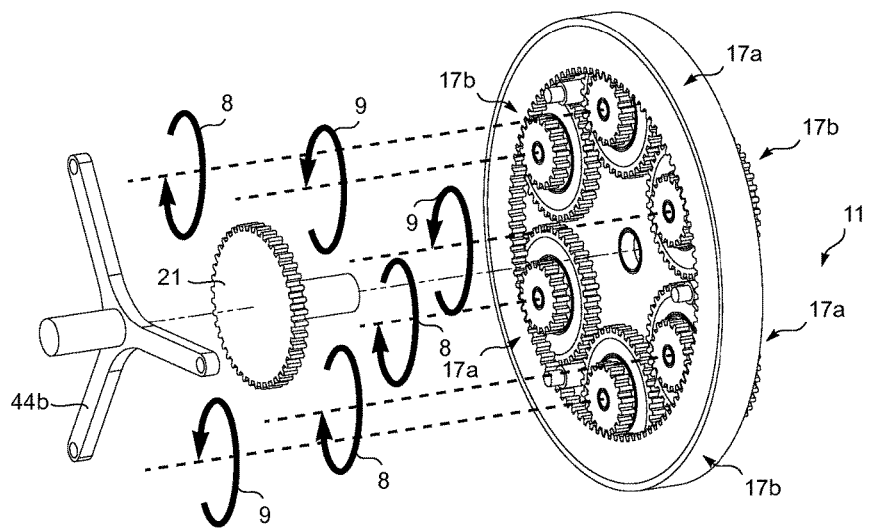
Fig. 50F

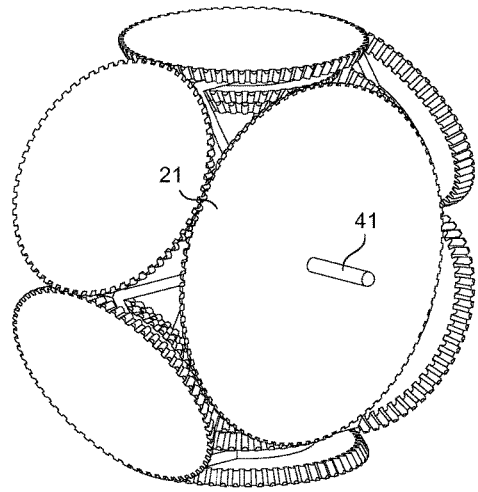
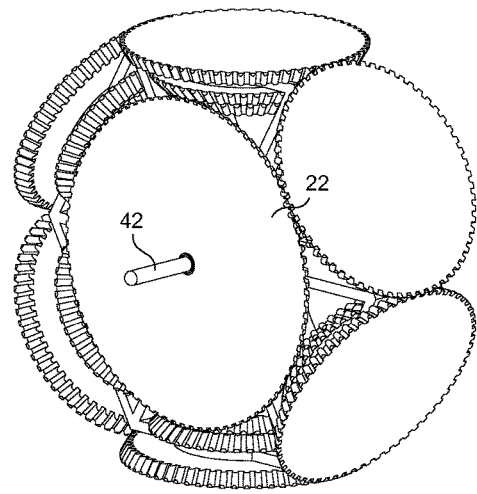
Fig. 54A  Fig. 54B
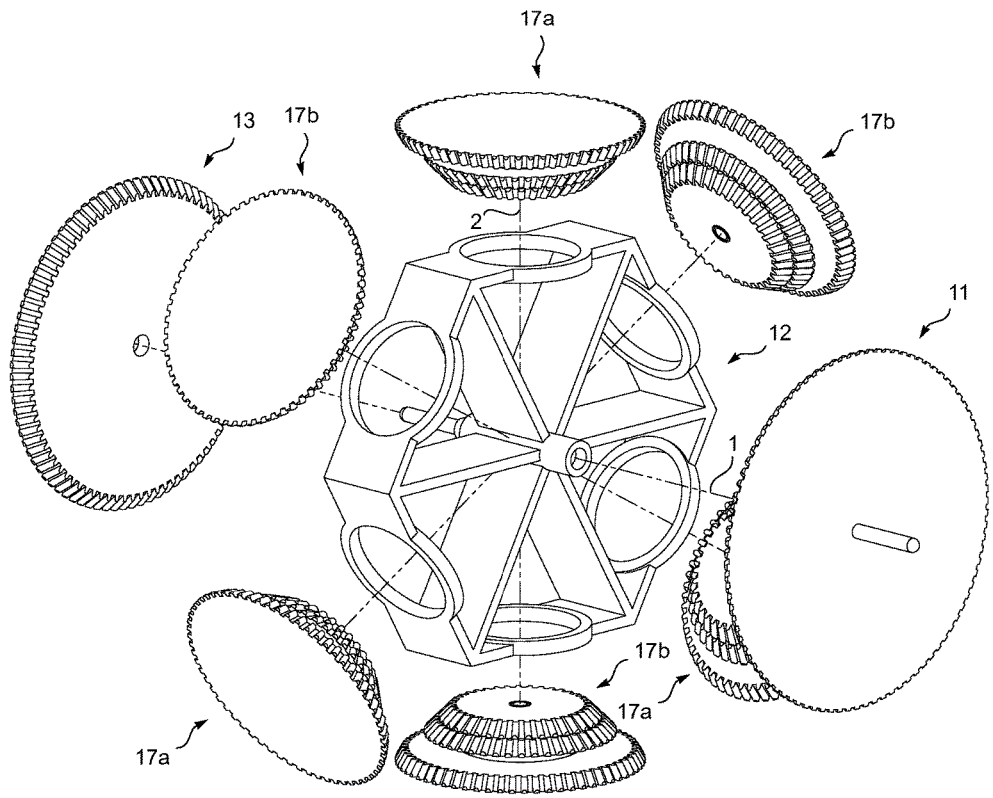
Fig. 54C

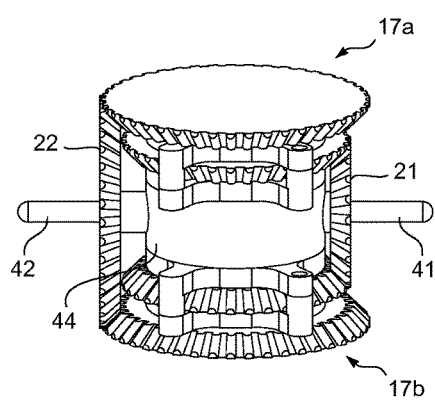
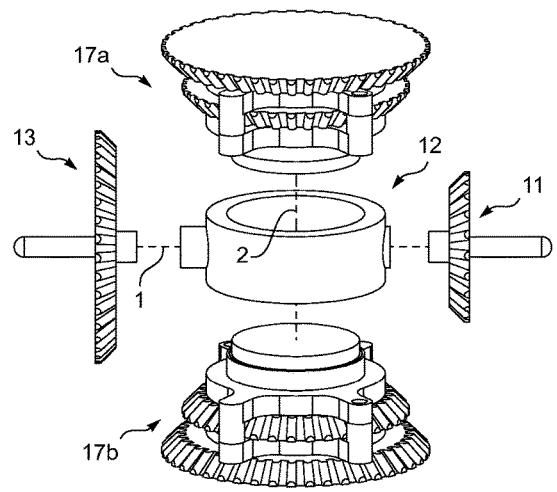
Fig. 55A             Fig. 55B
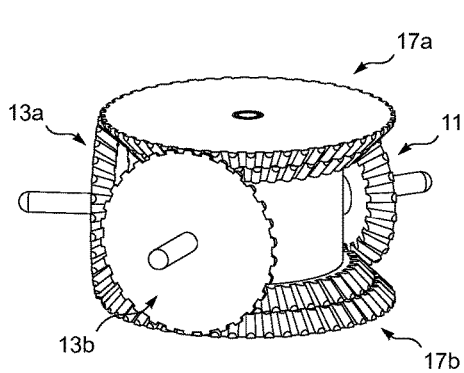
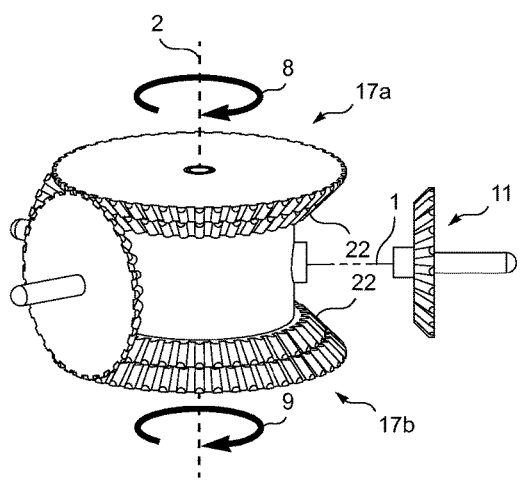
Fig. 56A             Fig. 56B

ANTI-BACKLASH GEAR

REFERENCE TO EARLIER FILED APPLICATIONS

This application claims priority to U.S. Provisional Application No. U.S. 61/752,040 filed Jan. 14, 2013 and U.S. Provisional Application No. U.S. 61/752,045 filed Jan. 14, 2013. Each of these patent applications are incorporated herein entirely by reference.

TECHNICAL FIELD

This disclosure herein relates to a gear device comprising a plurality of gears. More particularly the disclosure herein relates to an apparatus and method providing reducing backlash.

BACKGROUND

Existing methods for reducing backlash in a gear train typically involve pre-loading the internal members of the gear train. One method uses a flexible member to apply a torque between the two halves of a split gear to maintain uninterrupted engagement between corresponding teeth on the two halves of the split gear and opposite sides of the neighboring teeth of the gear being engaged.

Another method uses a flexible member to apply a torque between two carriers, each of which are rotatably coupled to one half of a split gear. The associated torque maintains uninterrupted engagement between corresponding teeth on the two halves of the split gear and opposite sides of the teeth of the gear being engaged.

Another method uses a flexible member to apply a radial force to a gear which is slidably coupled to a carrier along a radial axis. The associated force maintains uninterrupted engagement between both sides of the teeth of the gear and the gear being engaged.

Another method uses a gear with split, flexible teeth that are tangentially compressed when engaged to maintain uninterrupted engagement between the two halves of the split gear teeth and neighboring teeth on the gear being engaged.

Each pre-loading method introduces a static force which is present regardless of the external load applied to the gear train. This internal force generates friction and reduces energy efficiency under all but the maximum rated loading condition. If the external applied torque exceeds the internal preload torque, the flexible members comply and backlash returns. Consequently, the choice of spring constant trades off energy efficiency with output shaft stiffness, or torque capacity.

Anti-backlash reducer gears may be used to provide uninterrupted engagement between a sun gear and an orbit gear, thereby resulting in an anti-backlash planetary gear. Planetary gears have a number of advantageous qualities and are found in a variety of configurations. One configuration comprises a sun gear, an orbit gear, and one or more planet pinion gears mounted on a carrier. The orbit gear is the reference, the sun gear is the input, and the carrier is the output. The reducer gears may be conventional or stepped pinion gears.

Another configuration comprises two sun gears and one or more planet pinion gears mounted on a carrier. One sun gear is the reference, the carrier is the input, and the other sun gear is the output. The reducer gears may parallel or angled with respect to the sun gears. When the reducer gears are parallel, they are stepped pinion gears. When the reducer gears are angled, they may be conventional or stepped pinion gears.

Another configuration comprises two orbit gears and one or more planet pinion gears mounted on a carrier. One orbit gear is the reference, the carrier is the input, and the other orbit gear is the output. This configuration is commonly referred to as an orbit gear and is capable of higher reduction ratios than a conventional planetary gear.

Another configuration comprises two sun gears and one stepped ring gear mounted on a carrier. One sun gear is the reference, the carrier is the input, and the other sun gear is the output. This configuration is an alternate version of an orbit gear.

Another configuration comprises a reference gear, an output gear and a stepped gear mounted on a carrier. The stepped gear is angled with respect to the reference and output gears and follows a nutating path. This configuration is commonly referred to as a nutating gear and is capable of higher reduction ratios than a conventional planetary gear.

Another configuration is similar in construction to a planetary gear but the carrier is the reference and the orbit is the output. This configuration is commonly referred to as a star gear and is capable of lower reduction ratios than a conventional planetary gear but may be more energy efficient at high speeds since the stationary carrier does not experience mechanical resistance from the internal lubricant.

The exemplary embodiments disclosed herein each comprise one or more pairs of reducer assemblies to provide a low backlash coupling between a drive and driven gear without any internal pre-load forces. A backlash reduction method biases the two reducer assemblies in each pair in opposite directions to provide a stiff, low backlash, engagement path between the drive gear and driven gear for both directions of rotation. No energy is lost to pre-loading friction and the engagement paths do not comply under heavy loads. No flexible members or adjustment mechanisms are required and the method may be used to compensate for wear.

SUMMARY

Certain exemplary embodiments comprise a first engaging member, a second engaging member, a carrier member, one or more first reducer assemblies, and one or more second reducer assemblies. Each reducer assembly comprises a first reducer engaging member defining an input, a second reducer engaging member defining an output, and a reference member. The first engaging member simultaneously engages all first reducer engaging members. The second engaging member simultaneously engages all second reducer engaging members. The number of turns applied to the input of each reducer assembly with respect to the number of turns resulting at the output of each reducer assembly defines a reduction ratio for each reducer assembly. All first reducer assemblies provide a common first reduction ratio and all second reducer assemblies provide a common second reduction ratio.

In certain exemplary embodiments, the first engaging member is co-axial with the second engaging member.

In certain exemplary embodiments, all reference members are integral with the carrier member and the first reduction ratio is equal to the second reduction ratio.

In certain exemplary embodiments, each reducer assembly defines a reducer axis which is co-axial with the corresponding first and second reducer engaging members. Each reference member is rotatably coupled to the carrier member about the corresponding reducer axis, and the first reduction ratio is not equal to the second reduction ratio.

In certain exemplary embodiments, there are an equal number of first and second reducer assemblies. Each first reducer axis is co-axial with a corresponding second reducer axis, and the reference member of each first reducer assembly is integral with the reference member of the corresponding second reducer assembly.

In certain exemplary embodiments, each reducer assembly further comprises a third reducer engaging member which is fixably coupled to the corresponding reference member and is co-axial with the corresponding reducer axis. The third reducer engaging member of each first reducer assembly engages the third reducer engaging members of one or more second reducer assemblies whereby the reference members of all first reducer assemblies rotate in the same direction, and the reference members of all second reducer assemblies rotate in the opposite direction as the first reducer assemblies.

In certain exemplary embodiments, there are an equal number of first and second reducer assemblies and each first reducer axis is co-axial with a second reducer axis.

In certain exemplary embodiments, all first and second reducer axes are parallel, all first reducer axes are spaced from one another, and all second reducer axes are spaced from one another.

In certain exemplary embodiments, all first reducer axes are at an angle to one another, all second reducer axes are at an angle to one another, and all first and second reducer axes substantially intersect at a common point.

In certain exemplary embodiments, one or more reducer assemblies are a planetary reducer assembly.

In certain exemplary embodiments, one or more reducer assemblies are a nutating reducer assembly.

In certain exemplary embodiments, one or more reducer assemblies are a serial reducer assembly.

In certain exemplary embodiments, one or more reducer assemblies are a cycloid reducer assembly.

Certain exemplary embodiments comprise a first engaging member, a second engaging member, a carrier member, and two or more reducer assemblies each comprising a first reducer engaging member defining an input, a second reducer engaging member defining an output, and a reference member. The first engaging member simultaneously engages all first reducer engaging members. The second engaging member simultaneously engages all second reducer engaging members. The number of turns applied to the input of each reducer assembly with respect to the number of turns resulting at the output of each reducer assembly defines a reduction ratio for each reducer assembly.

In certain exemplary embodiments, all reference members are integral with the carrier member and the reduction ratio provided by all reducer assemblies is common.

In certain exemplary embodiments, each reducer assembly defines a reducer axis which is co-axial with the corresponding first and second reducer engaging members. Each reducer assembly further comprises a third reducer engaging member which is fixably coupled to the corresponding reference member and is co-axial with the corresponding reducer axis. Each reference member is rotatably coupled to the carrier member about the corresponding reducer axis. The reduction ratio of one or more reducer assemblies is common and unequal to the reduction ratio of the remaining reducer assemblies which is also common. Each third reducer engaging member is engaged with one or more third reducer engaging member from another reducer assembly whereby any two reducer assemblies with a common reduction ratio rotate in the same direction and any two reducer assemblies with an uncommon reduction ratio rotate in opposite directions.

In certain exemplary embodiments, there are an even number of reducer assemblies. Each reducer assembly defines a reducer axis which is co-axial with the corresponding first and second reducer engaging members. Each reference member is rotatably coupled to the carrier member about the corresponding reducer axis. The reduction ratio of half of the reducer assemblies is common and unequal to the reduction ratio of the remaining reducer assemblies which is also common. The reference member of each reducer assembly is fixably coupled to the reference member of a corresponding reducer assembly which has a co-axial reducer axis and an unequal reduction ratio.

In certain exemplary embodiments, a method is disclosed. The method provides a first engaging member, a second engaging member, a carrier member, and two or more reducer assemblies each comprising an input portion, an output portion and a reference portion wherein the number of turns applied to each input portion with respect to the number of turns resulting at each output portion defines a reduction ratio for the corresponding reducer assembly. One or more input portions are engaged to the first engaging member and the corresponding output portions are engaged to the second engaging member whereby all backlash is removed for one direction of rotation of the first engaging member. All remaining input portions are engaged to the first engaging member and the corresponding output portions are engaged to the second engaging member whereby all backlash is removed for the opposite direction of rotation of the first engaging member.

In certain exemplary embodiments, all reference members are integrated with the carrier member and a common reduction ratio is provided for all reducer assemblies.

In certain exemplary embodiments, each reducer assembly is provided with a reducer axis which is co-axial with the corresponding input and output portions. All reference members are rotatably coupled with the carrier member about the corresponding reducer axis. Reference members are engaged with one another whereby one or more reference members are configured to rotate in one direction and the remaining reference members are configured to rotate in the opposite direction. A common reduction ratio is provided for all reducer assemblies that rotate in a common direction.

BRIEF DESCRIPTION OF DRAWINGS

FIGS. 17-32 depict respectively, schematics in accordance with a fourteenth through twenty-ninth exemplary embodiment of a reducer assembly.

FIGS. 33A-33D depict respectively, a schematic, a perspective view, a cross-sectional side view, and an exploded perspective view in accordance with a thirtieth exemplary embodiment of a reducer assembly.

FIGS. 42A-42D depict respectively, a schematic, a perspective view, a cross-sectional side view, and an exploded perspective view in accordance with a ninth exemplary embodiment of an anti-backlash planetary gear.

FIGS. 44A-44B depict respectively, a perspective view, and an exploded perspective view in accordance with a first exemplary embodiment of an anti-backlash star gear.

FIGS. 45A-45B depict respectively, a perspective view, and an exploded perspective view in accordance with a second exemplary embodiment of an anti-backlash star gear.

FIGS. 46A-46E depict respectively, a schematic, a perspective view, an exploded perspective view, a cross-sectional side view, and an additional exploded perspective view in accordance with a fourth exemplary embodiment of an anti-backlash assembly.

FIGS. 50A-50F depict respectively, a schematic, a front view, a rear view, a cross-sectional side view, an exploded perspective view, and an additional exploded perspective view in accordance with a twelfth exemplary embodiment of an anti-backlash planetary gear.

FIGS. 54A-54C depict respectively, a front perspective view, a rear perspective view, and an exploded perspective view in accordance with a sixteenth exemplary embodiment of an anti-backlash planetary gear.

FIGS. 55A-55B depict respectively, a perspective view, and an exploded perspective view in accordance with a third exemplary embodiment of an anti-backlash star gear.

FIGS. 56A-56B depict respectively, a perspective view, and an exploded perspective view in accordance with a fourth exemplary embodiment of an anti-backlash star gear.

REFERENCE NUMERALS

Figure 1A:
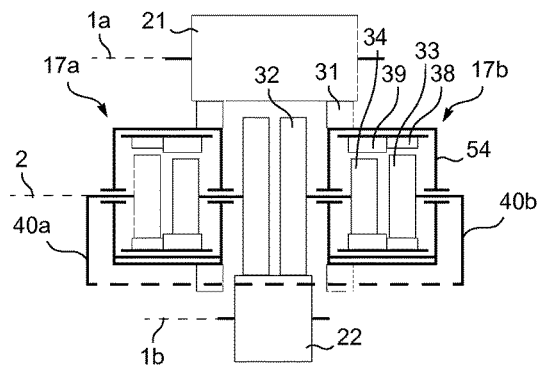
FIGS. 1A-1E depict respectively, a schematic, a perspective view, a cross-sectional side view, an exploded perspective view, and an additional exploded perspective view in accordance with a first exemplary embodiment of an anti-backlash assembly.
Figure 1B:
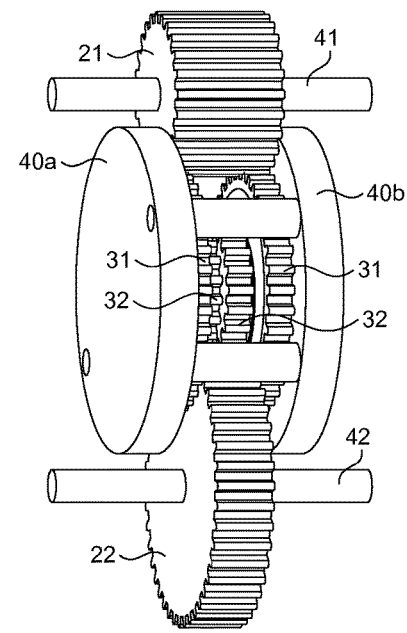
Figure 1C:
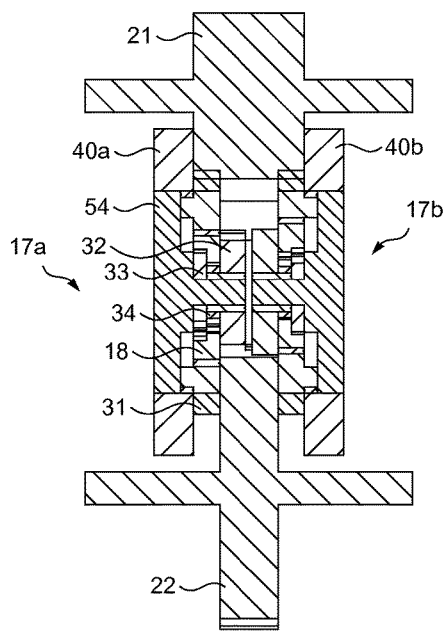

1—axis
2—reducer axis
3—eccentric axis
8—direction
9—direction
11—main drive assembly
12—carrier assembly
13—main driven assembly
14—drive assembly
15—driven assembly
16—reference assembly
17—reducer assembly
18—stepped gear assembly
19—cycloid assembly
21—first gear
22—second gear
31—first reducer gear
32—second reducer gear
33—third reducer gear
34—fourth reducer gear
35—fifth reducer gear
36—sixth reducer gear
38—first step
39—second step
40—case 41—input shaft
42—output shaft
44—carrier
45—post
50—driven member
51—eccentric shaft
52—eccentric race
53—drive member
54—reference member
55—cycloid shaft
56—cycloid race
60—bearing
61—bearing
62—bearing
63—bearing
64—bearing
65—bearing

DESCRIPTION OF EMBODIMENTS

Wherever possible, the same reference numerals are used throughout the accompanying drawings and descriptions to refer to the same or like parts. Components such as retainers and fasteners that do not substantially contribute to the functionality of the embodiments disclosed herein are neglected for the sake of simplicity.

Although spur gears and conical gears are used as exemplary engaging members in the accompanying drawings, it is understood that many other means would suffice, such as spiral gears, helical gears, double helical gears, herring-bone gears, roller tooth gears, friction couplings, magnetic couplings, pulleys and belts, or sprockets and chains.

Although a uniform tooth module is depicted in the accompanying drawings, it is understood that any module will suffice and that any number of different modules may be used as long as all pairs of engaging gears have equivalent modules. In particular, different modules and tooth geometries may be used to satisfy the different torque requirements of the individual members.

Although a straight tooth profile is depicted in the accompanying drawings, it is understood that any tooth profile will suffice, such as an involute profile with any desired pressure angle. It is also understood that any number of different tooth profiles may be used as long as all pairs of engaging gears have complementary tooth profiles.

It is understood that a spur gear comprises teeth arranged circumferentially on a cylindrical hub with a substantially uniform tooth profile. It is also understood that a radial gear comprises teeth arranged circumferentially on a circular hub with a non-uniform tooth profile. It is also understood that a conical gear comprises teeth arranged circumferentially on a conical hub with a non-uniform tooth profile. It is also understood that a conical gear may comprise teeth with a substantially uniform tooth profile to allow engagement with a spur gear.

It is understood that a conical or a radial gear comprise a non-uniform pitch radius. In the accompanying specification, the specified pitch radius of a conical or a radial gear corresponds to its minimum pitch radius.

It is understood that a ring gear engages on its interior surface and a pinion gear engages on its exterior surface. It is also understood that a conical ring gear engages on the surface that faces toward its rotation axis and a conical pinion gear engages on the surface that faces away from its rotation axis. A conical gear that engages on a surface that is parallel to its rotation axis is referred to as a radial gear.

Although bearings are used to depict rotatable couplings in the accompanying drawings, it is understood that any other means will suffice, such as roller bearings, plain or journal bearings, thrust bearings, low friction coatings, materials or surface treatments or favorable clearances and lubricants. It is also understood that the male and female members making up a rotatable coupling may often be interchanged without substantially affecting function. It is also understood that rotatably coupling a first member to a second member which is also rotatably coupled to a third member about a common axis, is equivalent to rotatably coupling the first member to the third member.

Although shafts are used to depict rotational inputs and outputs in the accompanying drawings, it is understood that any other means will suffice, such as eccentric or crank shafts, gears, friction couplings, pulleys, sprockets, female couplings, fastener interfaces such as keyways or threaded holes, or materials, circuits or assemblies providing a magnetic or electrostatic interface.

Any members that are described as integral in the following description are fixably connected. Although posts are also used to depict fixable connections in the accompanying drawings, it is understood that any other means will suffice, such as welds, fasteners, elongated members of any cross-sectional shape, or forming the integral parts from a single piece of material.

Although a cooling means is not depicted in the accompanying drawings, a person skilled in the art will appreciate that a cooling means such as cooling fins, a heat conduction system, a splashed lubricant bath, a forced fluid and heat exchange system, or a directed air flow system could be included and is contemplated.

Although each exemplary embodiment is depicted as a speed reducer, a person skilled in the art will appreciate that a speed reducer may be used to amplify speed by interchanging the roles of the input and output. In fact, the roles of the reference, input and output may all be interchanged to obtain a desired reduction or amplification ratio, or to cause the input and output to rotate in the same or opposite directions. Similarly, if any one is used as an input and the remaining two are used as outputs, then a differential mechanism is obtained. Consequently, reduction, amplification and differential mechanisms are all contemplated.

In the schematics illustrated in the accompanying drawings, gears are depicted as closed contours, rotatable couplings are depicted as thick parallel lines, stiff members are depicted as solid thick lines, and hidden, out of plane members are depicted using dotted lines.

A representative sample of embodiments is included in the accompanying figures for exemplary purposes only. A great number of additional tooth geometries, ring and pinion combinations and kinematic arrangements are also contemplated. The scope of the present invention is not limited to the embodiments included but spans all possible combinations anticipated by the specification and claims.

FIG. 1 illustrates a first exemplary embodiment of an anti-backlash assembly. The anti-backlash assembly provides a low backlash, speed reduced engagement path between a first gear 21 and a second gear 22 whereby high speed rotation of the first gear 21 results in low speed rotation of the second gear 22 with minimal free-play between the first gear 21 and the second gear 22.

The anti-backlash assembly comprises a case 40 and a pair of substantially equivalent reducer assemblies 17a, 17b which each provide a common reduction ratio. The reducer assemblies 17a, 17b are axially aligned about a common reducer axis 2. The first gear 21 and second gear 22 each define an axis 1a, 1b, which is parallel and spaced from the reducer axis 2. The axes 1a and 1b may be configured to be parallel or co-axial with each other.

Each reducer assembly 17 comprises a drive assembly 14, a driven assembly 15, and a reference assembly 16, all co-axial with the reducer axis 2. Each reducer assembly 17 further comprises a stepped gear assembly 18 defining an eccentric axis 3 which is substantially parallel to and spaced from the reducer axis 2.

A first reducer gear 31, a drive member 53 and an eccentric race 52 are integral and combine with a bearing 62 to form the drive assembly 14. The eccentric race 52 is co-axial with the eccentric axis 3. A second reducer gear 32 and a fourth reducer gear 34 are integral and combine with a bearing 64 to form the driven assembly 15. A third reducer gear 33 and a reference member 54 are integral and fixably connected to the case 40 to form the reference assembly 16. A first step 38 and a second step 39 are integral and fixably combined with a bearing 63 to form the stepped gear assembly 18.

Bearing 62 rotatably couples the drive assembly 14 to the reference assembly 16. Bearing 64 rotatably couples the driven assembly 15 to the reference assembly 16. Bearing 63 rotatably couples the stepped gear assembly 18 to the drive assembly 14.

The first gear 21 simultaneously engages both first reducer gears 31. Each first step 38 engages the corresponding third reducer gear 33. Each second step 39 engages the corresponding fourth reducer gear 34. Both second reducer gears 32 simultaneously engage the second gear 22.

Rotating the first gear 21 causes both drive assemblies 14 to rotate. Each drive assembly 14 guides the corresponding stepped gear assembly 18 along an eccentric path. The first step 38 engages the stationary third reducer gear 33, causing the stepped gear assembly 18 to rotate inside the eccentric race 52 as it circulates around the reducer axis 2. The second step 39 engages the fourth reducer gear 34, causing the driven assembly 15 to rotate. Rotation of the two driven assemblies 15 causes the second gear 22 to rotate at a lower rate than the first gear 21.

Figure 1D:
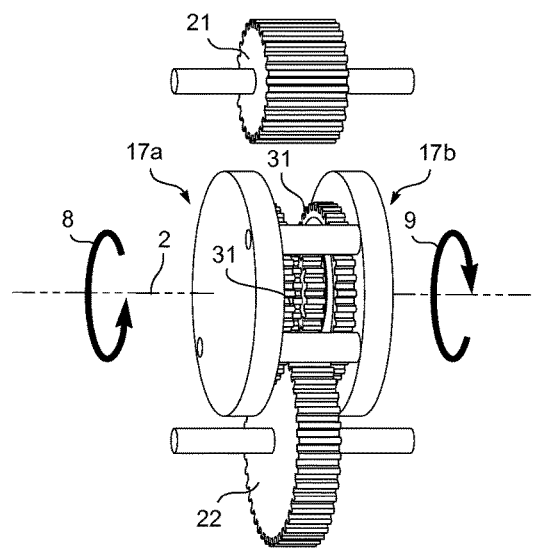
Figure 1E:
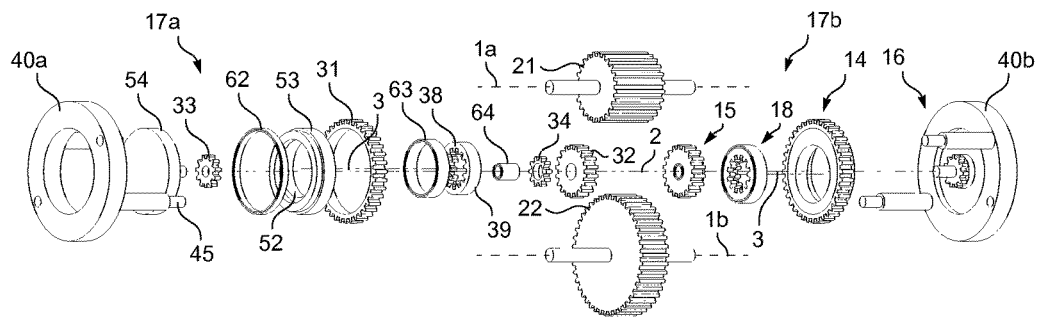

FIG. 1D illustrates the method for reducing backlash. First the first gear 21 is disengaged from the anti-backlash assembly. Next, the first reducer gear 31 of reducer assembly 17a is rotated in one direction 8 while the first reducer gear 31 of reducer assembly 17b is rotated in the opposite direction 9 until the teeth of the second reducer gear 32 of reducer assembly 17a and the teeth of the second reducer gear 32 of reducer assembly 17b come into contact with opposite sides of the teeth of second gear 22. Finally, the first gear 21 is re-engaged with the anti-backlash assembly. It is understood that the directions 8 and 9 could be reversed without substantially affecting the method.

For one direction of rotation of first gear 21, the second reducer gear 32 of reducer assembly 17a transmits torque to second gear 22 while the second reducer gear 32 of reducer assembly 17b follows the rotational trajectory without contributing to, or impeding the applied torque. For the opposite direction of rotation of first gear 21, the second reducer gear 32 of reducer assembly 17b transmits torque to second gear 22 while the second reducer gear 32 of reducer assembly 17a follows the rotational trajectory without contributing to, or impeding the applied torque. A stiff, anti-backlash engagement path is provided between first gear 21 and second gear 22 for each direction of rotation by one of the two reducer assemblies 17.

Figure 2A:
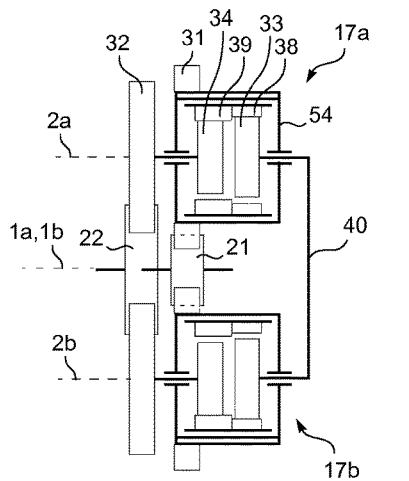
FIGS. 2A-2C depict respectively, a schematic, a perspective view, and an exploded perspective view in accordance with a second exemplary embodiment of an anti-backlash assembly.
Figure 2B:
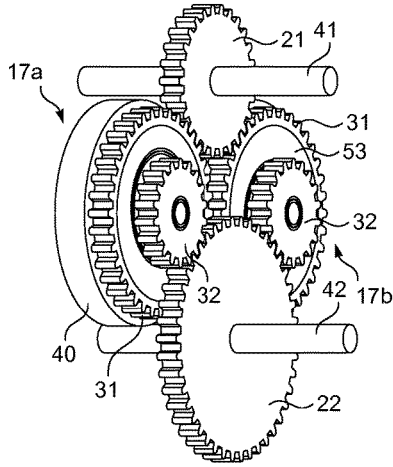
Figure 2C:
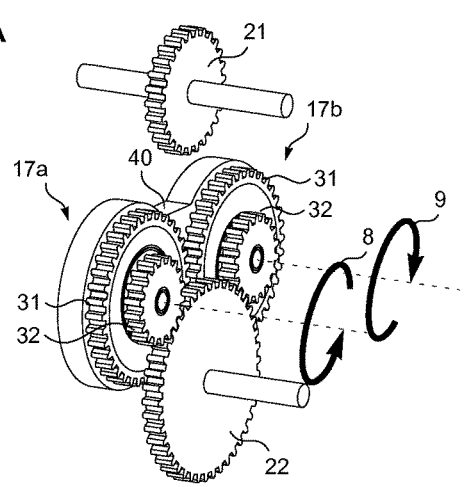

FIG. 2 illustrates a second exemplary embodiment of an anti-backlash assembly. The backlash reduction method is illustrated in FIG. 2C. The second exemplary embodiment is substantially equivalent to the first exemplary embodiment illustrated in FIG. 1, except for the following. In the second exemplary embodiment, the reducer assemblies 17a, 17b are arranged in a co-planar rather than a co-axial configuration whereby the reducer axes 2a, 2b are substantially parallel to and spaced from one another. In addition, the two first reducer gears 31 each engage the first gear 21 at a different point on the first gear 21 pitch surface. In addition, the two second reducer gears 32 each engage the second gear 21 at a different point on the second gear 22 pitch surface.

Figure 3A:
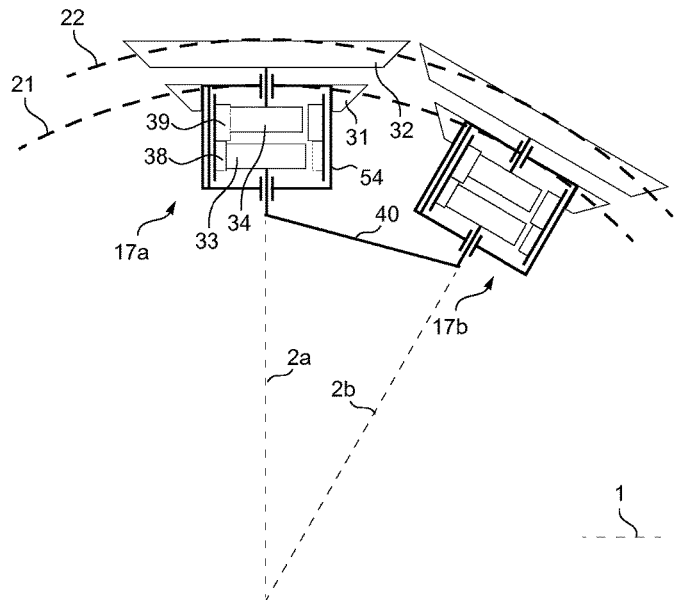
FIGS. 3A-3C depict respectively, a schematic, a perspective view, and an exploded perspective view in accordance with a third exemplary embodiment of an anti-backlash assembly.
Figure 3B:
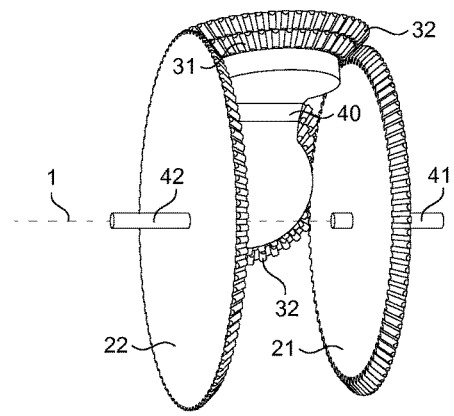
Figure 3C:
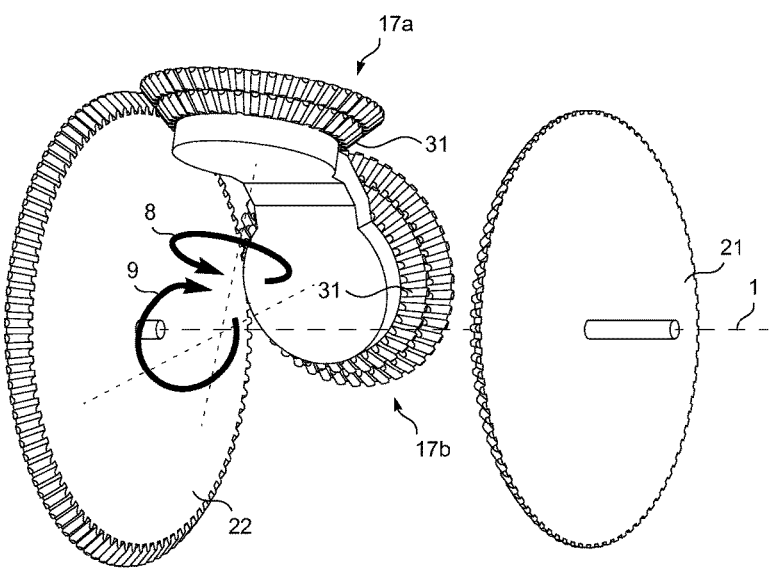
Figure 4A:
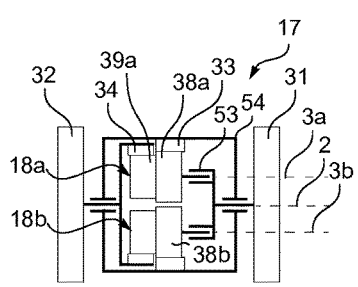
FIGS. 4A-4D depict respectively, a schematic, a perspective view, a cross-sectional side view, and an exploded perspective view in accordance with a first exemplary embodiment of a reducer assembly.
Figure 4B:
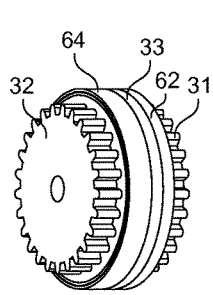
Figure 4C:
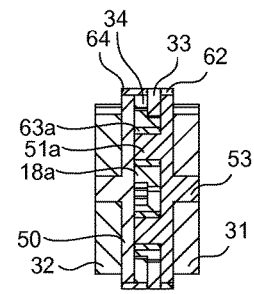
Figure 4D:
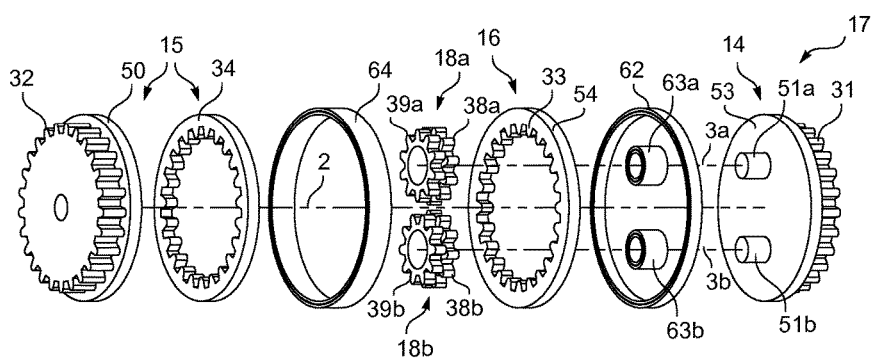
Figure 5A:
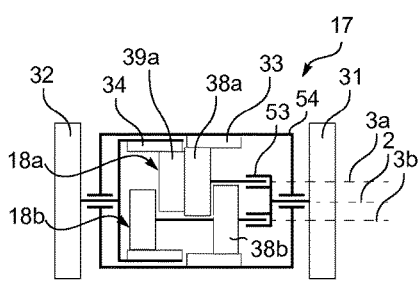
FIGS. 5A-5D depict respectively, a schematic, a perspective view, a cross-sectional side view, and an exploded perspective view in accordance with a second exemplary embodiment of a reducer assembly.
Figure 5B:
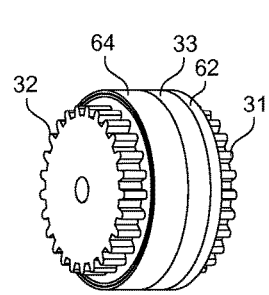
Figure 5C:
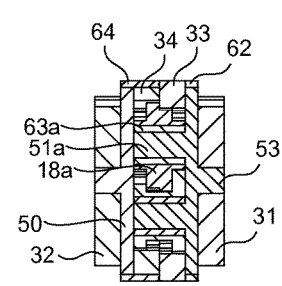
Figure 5D:
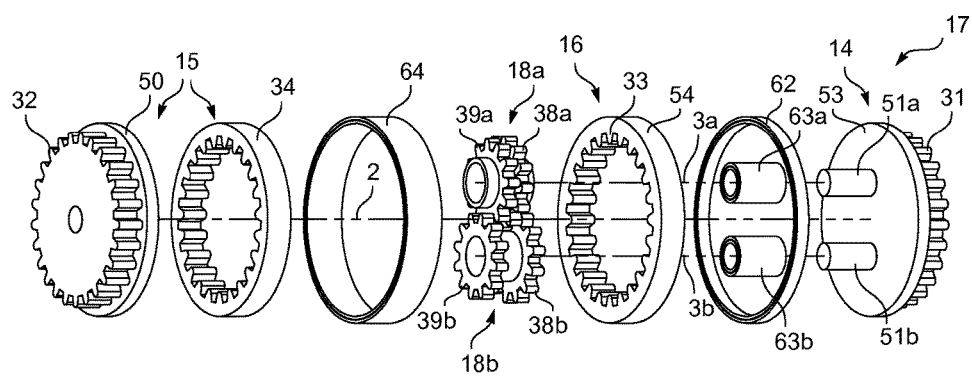

FIG. 3 illustrates a third exemplary embodiment of an anti-backlash assembly. The backlash reduction method is illustrated in FIG. 3C. In FIG. 3A, the first gear 21 and second gear 22 are depicted as invisible members. The third exemplary embodiment is substantially equivalent to the second exemplary embodiment illustrated in FIG. 2, except for the following. In the third exemplary embodiment, the reducer assemblies 17a, 17b are arranged in a circumferential rather than a co-planer configuration whereby the reducer axes 2a, 2b are at an angle to one another and substantially intersect at a common point on a central axis 1. In addition, the central axis 1 is common for the first gear 21 and second gear 22 and is substantially perpendicular to the plane defined by the two reducer axes 2a, 2b. In addition, the first gear 21, second gear 22, first reducer gears 31 and second reducer gears 32 are bevel gears rather than spur gears, although spur gears would suffice.

The method for reducing backlash illustrated in FIGS. 2C and 3C is similar to that described for FIG. 1D. It is understood that the directions 8 and 9 could be reversed without substantially affecting the method.

FIGS. 4-33 illustrate respectively, a first through thirtieth exemplary embodiment of a reducer assembly 17. Although the eighth exemplary embodiment illustrated in FIG. 11 is depicted in the exemplary embodiments of an anti-backlash assembly illustrated in FIGS. 1-3, any one of the thirty reducer assembly 17 exemplary embodiments would suffice. It is understood that many of the exemplary reducer assemblies 17 comprise a non-uniform mass distribution and may benefit from a counter-balancing means to reduce vibration. It is also understood that any of the exemplary reducer assemblies 17 may be configured so that the first reducer gear 31 and second reducer gear 32 are on located opposite sides, or on the same side of the reference member 54.

FIGS. 4-15 and 29-32 illustrate alternative embodiments of a planetary reducer assembly 17. FIGS. 16-24 illustrate alternative embodiments of a nutating reducer assembly 17. FIGS. 25-28 illustrate alternative embodiments of a serial reducer assembly 17. FIG. 33 illustrates a cycloid reducer assembly 17.

FIGS. 4-7 illustrate respectively, a first through fourth exemplary embodiment of a reducer assembly 17 comprising a drive member 53 which supports a plurality of stepped gear assemblies 18a, 18b to provide a counter-balanced orbit gear. Each stepped gear assembly 18 is rotatably coupled to the drive member 53 comprising two eccentric shafts 51a, 51b, each defining an eccentric axis 3a, 3b which are each parallel to and spaced from the reducer axis 2.

Figure 6:
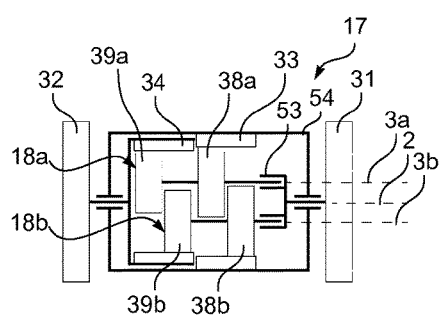
FIGS. 6-7 depict respectively, schematics in accordance with a third and fourth exemplary embodiment of a reducer assembly.

The first through third exemplary embodiments of a reducer assembly 17 illustrated in FIGS. 4-6 respectively, each comprise a ring third reducer gear 33, a ring fourth reducer gear 34, a pinion first step 38 and a pinion second step 39. The second and third exemplary embodiments of a reducer assembly 17 illustrated in FIGS. 5 and 6 respectively, each comprise stepped gear assemblies 18a, 18b that overlap one another to provide a counter-balanced orbit gear.

Figure 7:
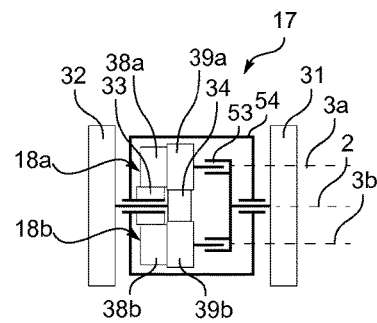
Figure 8A:
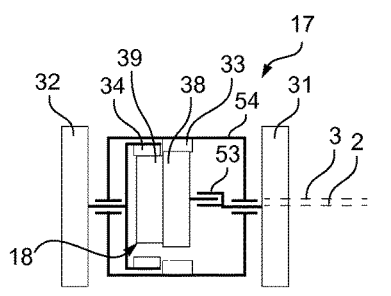
FIGS. 8A-8D depict respectively, a schematic, a perspective view, a cross-sectional side view, and an exploded perspective view in accordance with a fifth exemplary embodiment of a reducer assembly.
Figure 8B:
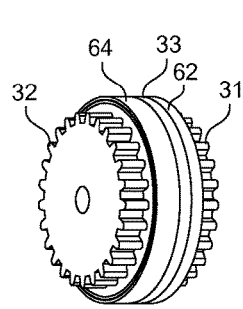
Figure 8C:
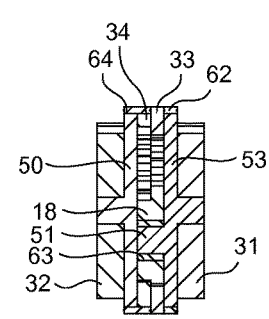
Figure 8D:
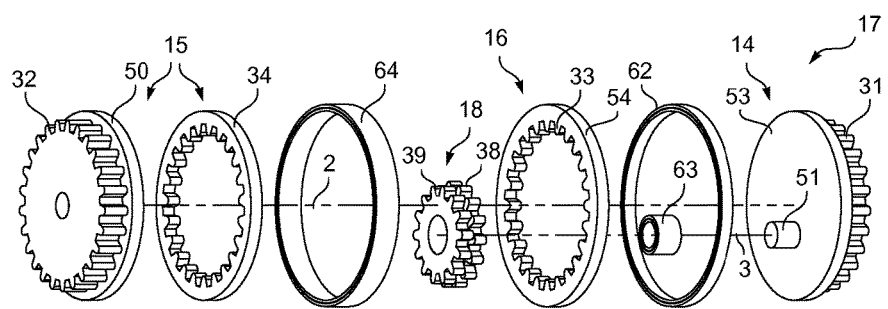

The fourth exemplary embodiment of a reducer assembly 17 illustrated in FIG. 7 comprises a pinion third reducer gear 33, a pinion fourth reducer gear 34, a pinion first step 38 and a pinion second step 39.

FIGS. 8-11 illustrate respectively, a fifth through eighth exemplary embodiment of a reducer assembly 17 comprising a drive member 53 which supports a stepped gear assembly 18 which is rotatably coupled to the drive member 53 about an eccentric axis 3 which is parallel to and spaced from the reducer axis 2, thereby providing an orbit gear.

The fifth exemplary embodiment of a reducer assembly 17 illustrated in FIG. 8 comprises a ring third reducer gear 33, a ring fourth reducer gear 34, a pinion first step 38 and a pinion second step 39.

Figure 9:
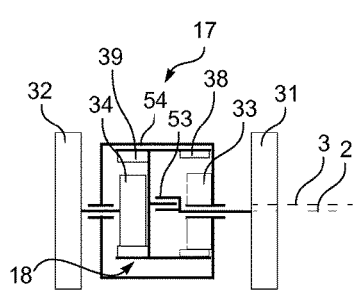
FIGS. 9-10 depict respectively, schematics in accordance with a sixth and seventh exemplary embodiment of a reducer assembly.

The sixth exemplary embodiment of a reducer assembly 17 illustrated in FIG. 9 comprises a pinion third reducer gear 33, a pinion fourth reducer gear 34, a ring first step 38 and a ring second step 39.

Figure 10:
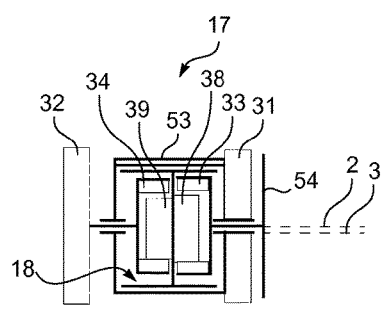
Figure 11A:
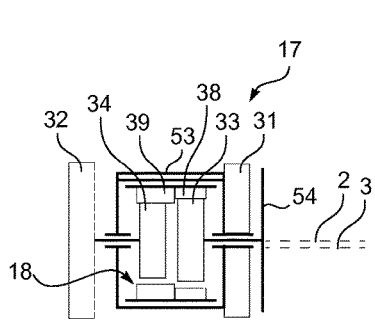
FIGS. 11A-11D depict respectively, a schematic, a perspective view, a cross-sectional side view, and an exploded perspective view in accordance with an eighth exemplary embodiment of a reducer assembly.
Figure 11B:
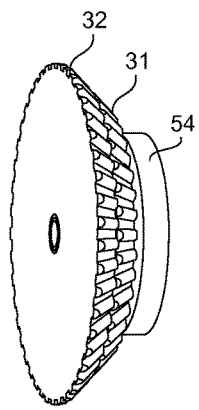
Figure 11C:
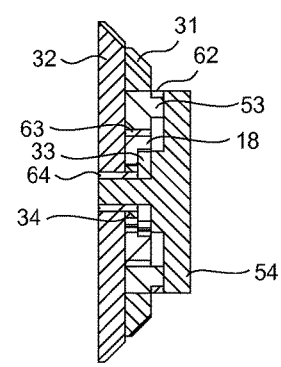
Figure 11D:
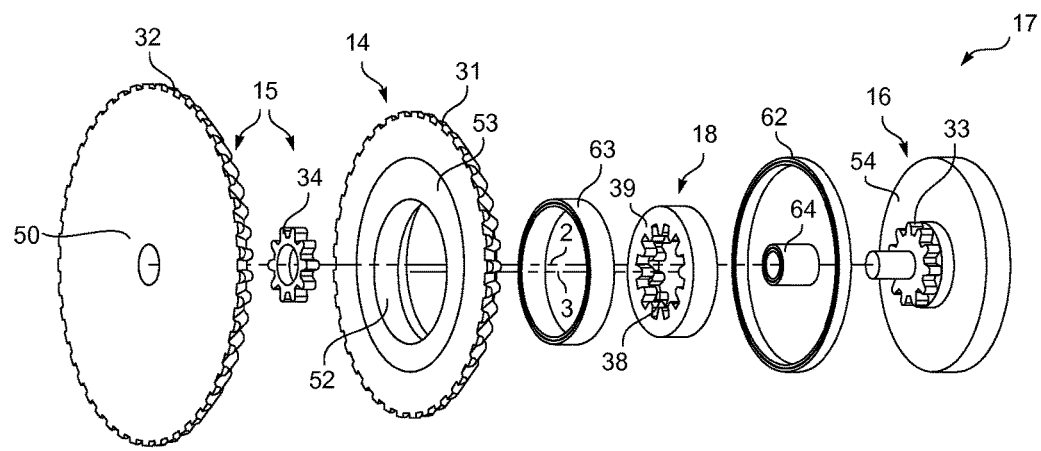

The seventh exemplary embodiment of a reducer assembly 17 illustrated in FIG. 10 comprises a ring third reducer gear 33, a ring fourth reducer gear 34, a pinion first step 38 and a pinion second step 39.

The eighth exemplary embodiment of a reducer assembly 17 illustrated in FIG. 11 comprises a pinion third reducer gear 33, a pinion fourth reducer gear 34, a ring first step 38 and a ring second step 39. In FIGS. 11B-11D, first reducer gear 31 and second reducer gear 32 are conical gears as depicted in the third exemplary embodiment of an anti-backlash assembly illustrated in FIG. 3.

Figure 12:
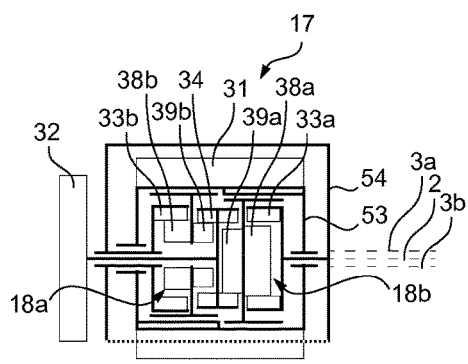
FIG. 12 depicts a schematic in accordance with a ninth exemplary embodiment of a reducer assembly.

FIGS. 12-13 illustrate respectively, a ninth and tenth exemplary embodiment of a reducer assembly 17 comprising a drive member 53 comprising two eccentric races 52a, 52b, which are each rotatably coupled to a stepped gear assembly 18a, 18b, by a bearing 63. Each stepped gear assembly 18a, 18b engages a third reducer gear 33a, 33b, and a common fourth reducer gear 34 which is sufficiently deep to allow simultaneous engagement with the two stepped gear assemblies 18a, 18b. Alternatively, the common fourth reducer gear 34 could be replaced by two separate gears, one belonging to each reducer assembly 17a, 17b. The reference assembly 16 comprises a split reference member 54a, 54b joined by a plurality of posts 45 to support the two third reducer gears 33a, 33b on opposite sides of the drive assembly 14. Each stepped gear assembly 18a, 18b is co-axial with an eccentric axis 3a, 3b which is parallel to and spaced from the reducer axis 2. The two eccentric axes 3a, 3b are located on opposite sides of the reducer axis 2 to provide a balanced mass distribution and a counter-balanced orbit gear.

The ninth exemplary embodiment of a reducer assembly 17 illustrated in FIG. 12 comprises ring third reducer gears 33a, 33b, a ring fourth reducer gear 34, pinion first steps 38a, 38b, and pinion second steps 39a, 39b.

The tenth exemplary embodiment of a reducer assembly 17 illustrated in FIG. 13 comprises pinion third reducer gears 33a, 33b, a pinion fourth reducer gear 34, ring first steps 38a, 38b, and ring second steps 39a, 39b.

Figure 13A:
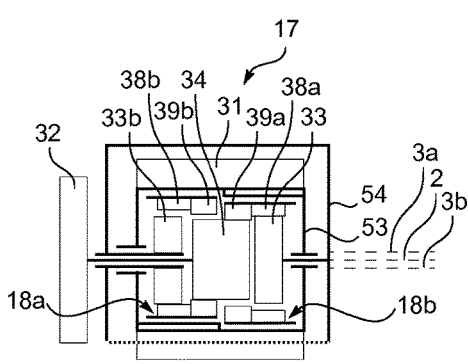
FIGS. 13A-13D depict respectively, a schematic, a perspective view, a cross-sectional side view, and an exploded perspective view in accordance with a tenth exemplary embodiment of a reducer assembly.
Figure 13B:
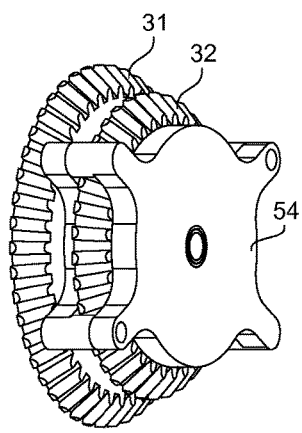
Figure 13C:
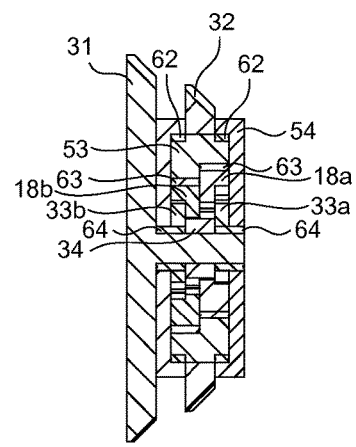
Figures 13D, 14, 15, 16A, 16B, 16C:
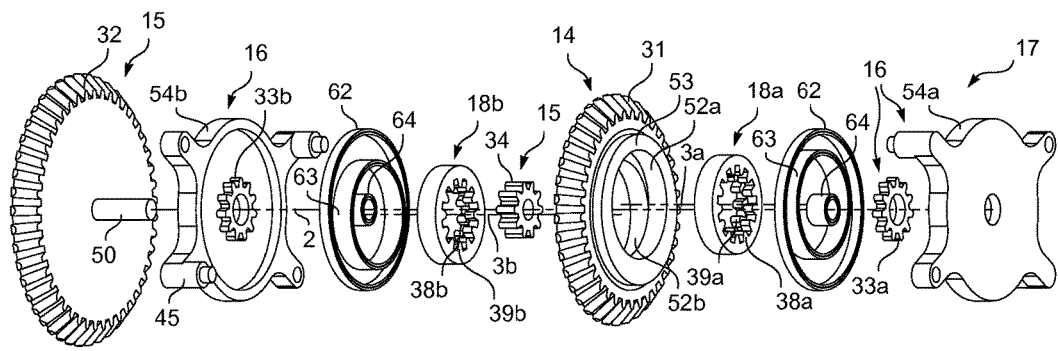
FIGS. 14-15 depict respectively, schematics in accordance with an eleventh and twelfth exemplary embodiment of a reducer assembly.
FIGS. 16A-16D depict respectively, a schematic, a perspective view, a cross-sectional side view, and an exploded perspective view in accordance with a thirteenth exemplary embodiment of a reducer assembly.

FIGS. 14-15 illustrate respectively, an eleventh and twelfth exemplary embodiment of a reducer assembly 17 comprising a drive member 53 which supports a stepped gear assembly 18 which is rotatably coupled to the drive member 53 about an eccentric axis 3 which is parallel to and spaced from the reducer axis 2, thereby providing an orbit gear.

The eleventh exemplary embodiment of a reducer assembly 17 illustrated in FIG. 14 comprises a ring third reducer gear 33, a pinion fourth reducer gear 34, a pinion first step 38 and a ring second step 39.

The twelfth exemplary embodiment of a reducer assembly 17 illustrated in FIG. 15 comprises a ring third reducer gear 33, a ring fourth reducer gear 34, a pinion first step 38 and a pinion second step 39. The twelfth exemplary embodiment is substantially equivalent to the fifth exemplary embodiment illustrated in FIG. 8, except for the following. The third reducer gear 33, fourth reducer gear 34, first step 38 and second step 39 are bevel gears rather than spur gears. It is anticipated that any pair of mating spur gears in any of the first through eleventh exemplary embodiments may be replaced by a pair of mating bevel gears, as depicted in the twelfth exemplary embodiment.

FIGS. 16-24 illustrate respectively, a thirteenth through twenty-first exemplary embodiment of a reducer assembly 17 comprising a drive member 53 comprising an eccentric shaft 51 or eccentric race 52 defining an eccentric axis 3 which is at an angle to and substantially intersecting the reducer axis 2. The eccentric shaft 51 or eccentric race 52 supports and is rotatably coupled to a stepped gear assembly 18 by a bearing 63. Rotation of the drive assembly 14 causes the stepped gear assembly 18 to follow a nutating path as it simultaneously engages the fixed third reducer gear 33 and the fourth reducer gear 34, causing the driven assembly 15 to rotate, thereby providing a nutating gear.

Figure 16D:
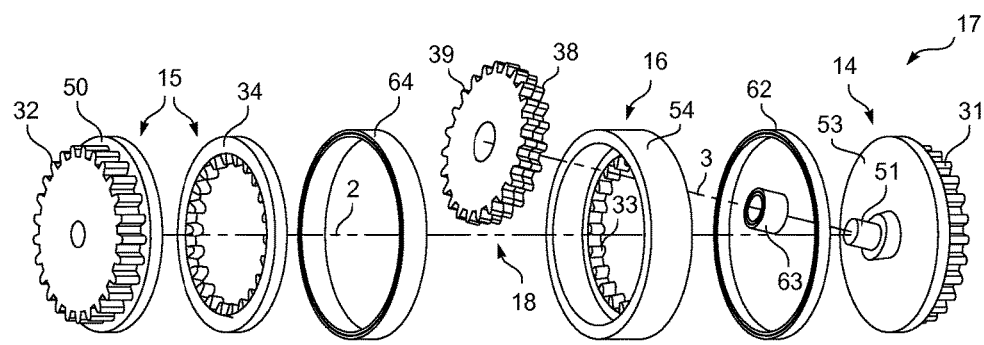

The thirteenth exemplary embodiment of a reducer assembly 17 illustrated in FIG. 16 comprises a bevel third reducer gear 33, a bevel fourth reducer gear 34, a pinion first step 38 and a pinion second step 39.

Figure 17:
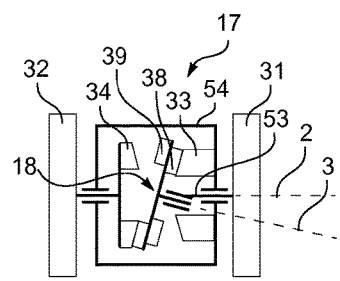

The fourteenth exemplary embodiment of a reducer assembly 17 illustrated in FIG. 17 comprises a bevel third reducer gear 33, a bevel fourth reducer gear 34, a radial first step 38 and a radial second step 39.

Figure 18:
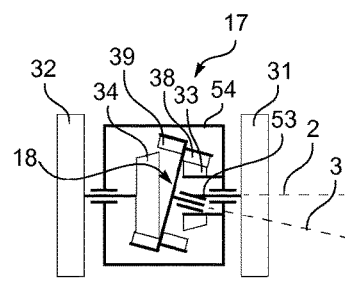

The fifteenth exemplary embodiment of a reducer assembly 17 illustrated in FIG. 18 comprises a bevel third reducer gear 33, a bevel fourth reducer gear 34, a ring first step 38 and a ring second step 39.

Figure 19:
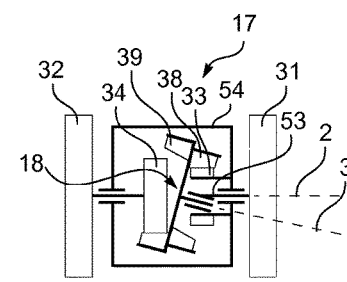

The sixteenth exemplary embodiment of a reducer assembly 17 illustrated in FIG. 19 comprises a pinion third reducer gear 33, a pinion fourth reducer gear 34, a bevel first step 38 and a bevel second step 39.

Figure 20:
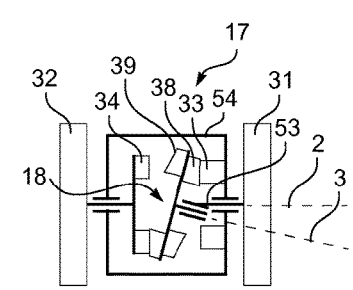
Figure 34A:
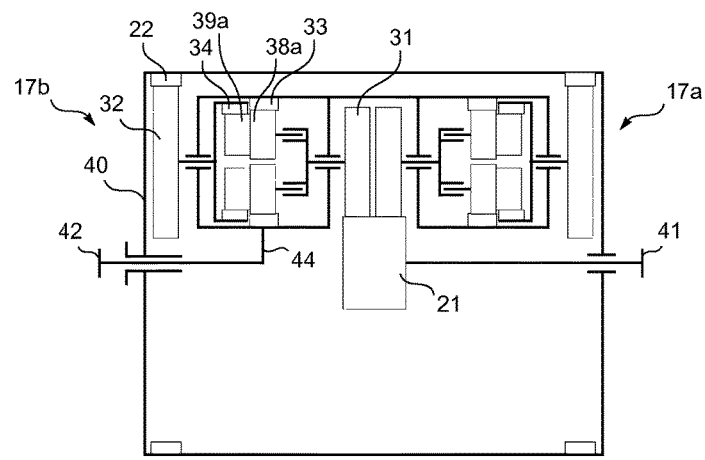
FIGS. 34A-34D depict respectively, a schematic, an exploded side view, a cross-sectional side view, and an exploded perspective view in accordance with a first exemplary embodiment of an anti-backlash planetary gear.
Figure 34B:
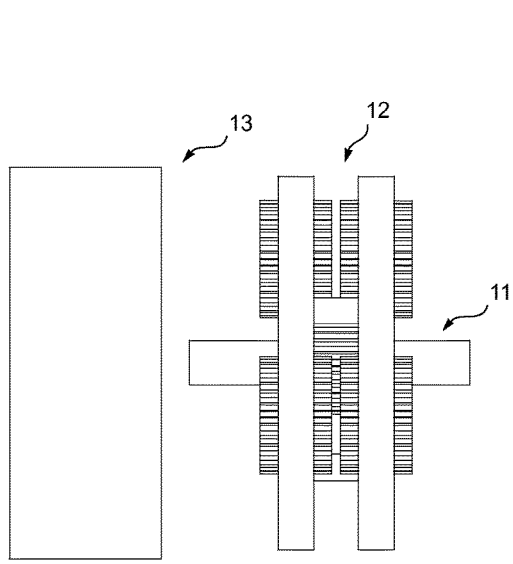
Figure 34C:
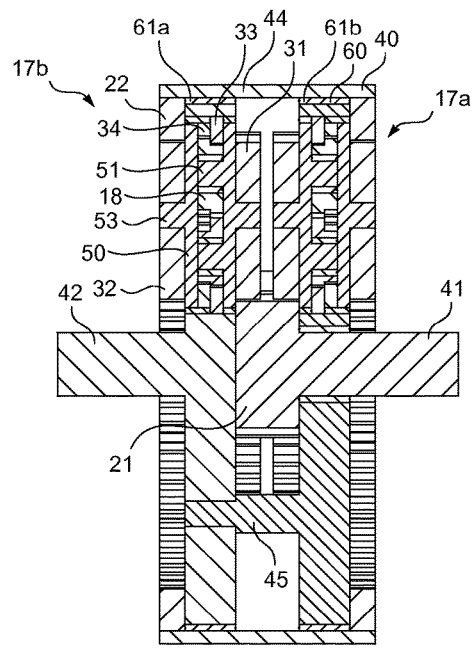
Figure 34D:
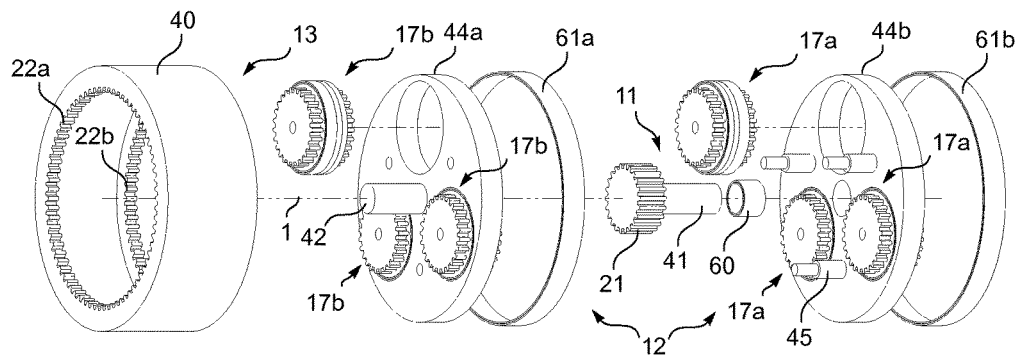

The seventeenth exemplary embodiment of a reducer assembly 17 illustrated in FIG. 20 comprises a radial third reducer gear 33, a radial fourth reducer gear 34, a bevel first step 38 and a bevel second step 39.

The eighteenth exemplary embodiment of a reducer assembly 17 illustrated in FIG. 21 comprises a ring third reducer gear 33, a ring fourth reducer gear 34, a bevel first step 38 and a bevel second step 39.

The nineteenth exemplary embodiment of a reducer assembly 17 illustrated in FIG. 22 comprises a bevel third reducer gear 33, a bevel fourth reducer gear 34, a bevel first step 38 and a bevel second step 39.

The twentieth exemplary embodiment of a reducer assembly 17 illustrated in FIG. 23 comprises a radial third reducer gear 33, a radial fourth reducer gear 34, a bevel first step 38 and a bevel second step 39. The twentieth exemplary embodiment is substantially equivalent to the seventeenth exemplary embodiment illustrated in FIG. 20, except for the following. Drive member 53 comprises an eccentric race 52 rather than an eccentric shaft 51 which is rotatably coupled to the stepped gear assembly 18. Any of the thirteenth through nineteenth exemplary embodiments of a reducer assembly 17 may have their male drive member 53 replaced by a female drive member 53 similar to that depicted in the twentieth exemplary embodiment.

The twenty-first exemplary embodiment of a reducer assembly 17 illustrated in FIG. 24 comprises a bevel third reducer gear 33, a bevel fourth reducer gear 34, a radial first step 38 and a ring second step 39. The twenty-first exemplary embodiment comprises a first step 38 which is dissimilar from the second step 39. It is understood that a nutating reducer assembly 17 may comprise any combination of pinion, radial, ring and bevel gears that may be configured to align correctly and that the particular combination used for the third reducer gear 33 and first step 38 may be different from the particular combination used for the fourth reducer gear 34 and second step 39. All possible combinations are anticipated.

FIGS. 25-28 illustrate respectively, a twenty-second through twenty-fifth exemplary embodiment of a reducer assembly 17 comprising a serial chain of two or more stepped gear assemblies. The first reducer gear 31 and a sixth reducer gear 36 together comprise the first stepped gear assembly in the sequence. The fourth reducer gear 34 and second reducer gear 32 together comprise the final stepped gear assembly in the sequence, thereby providing a serial gear.

The twenty-second exemplary embodiment of a reducer assembly 17 illustrated in FIG. 25 comprises a pinion fourth reducer gear 34, a pinion sixth reducer gear 36, and one intermediate stepped gear assembly 18 comprising a pinion first step 38 and a pinion second step 39.

The twenty-third exemplary embodiment of a reducer assembly 17 illustrated in FIG. 26 comprises a pinion fourth reducer gear 34, a pinion sixth reducer gear 36, and a plurality of intermediate stepped gear assemblies 18a, 18b, 18c each comprising a pinion first step 38a, 38b, 38c and a pinion second step 39a, 39b, 39c.

The twenty-fourth exemplary embodiment of a reducer assembly 17 illustrated in FIG. 27 comprises a ring fourth reducer gear 34, and a pinion sixth reducer gear 36.

The twenty-fifth exemplary embodiment of a reducer assembly 17 illustrated in FIG. 28 comprises a ring fourth reducer gear 34, a pinion sixth reducer gear 36, and a plurality of intermediate stepped gear assemblies 18a, 18b, 18c each comprising a ring first step 38a, 38b, 38c and a pinion second step 39a, 39b, 39c.

FIGS. 29-32 illustrate respectively, a twenty-sixth through twenty-ninth exemplary embodiment of a reducer assembly 17 comprising a driven member 50 which supports a plurality of planet gears to provide a planetary gear. Each planet gear is rotatably coupled to the driven member 50 about an eccentric axis 3a, 3b.

The twenty-sixth exemplary embodiment of a reducer assembly 17 illustrated in FIG. 29 comprises a ring third reducer gear 33, a pinion fourth reducer gear 34, and stepped planet gear assemblies each comprising a pinion first step 38 and a pinion second step 39. The eccentric axes 3a, 3b are parallel to and spaced from the reducer axis 2.

The twenty-seventh exemplary embodiment of a reducer assembly 17 illustrated in FIG. 30 comprises a ring third reducer gear 33, a pinion fourth reducer gear 34, and single stage planet gears each comprising a pinion sixth reducer gear 36. The eccentric axes 3a, 3b are parallel to and spaced from the reducer axis 2.

The twenty-eighth exemplary embodiment of a reducer assembly 17 illustrated in FIG. 31 comprises a bevel third reducer gear 33, a bevel fourth reducer gear 34, and stepped planet gear assemblies each comprising a bevel first step 38 and a bevel second step 39. The eccentric axes 3a, 3b are at an angle to and substantially intersect the reducer axis 2.

The twenty-ninth exemplary embodiment of a reducer assembly 17 illustrated in FIG. 32 comprises a bevel third reducer gear 33, a bevel fourth reducer gear 34, and single stage planet gears each comprising a bevel sixth reducer gear 36. The eccentric axes 3a, 3b are at an angle to and substantially intersect the reducer axis 2.

FIG. 33 illustrates, a thirtieth exemplary embodiment of a reducer assembly 17 comprising a drive assembly 14, a driven assembly 15, a reference assembly 16, and a cycloid assembly 19. The drive assembly 14 comprises a drive gear 31, a drive member 53 and an eccentric shaft 51. The driven assembly 15 comprises a driven gear 32, a driven member 50 and a plurality of cycloid races 56. The reference assembly 16 comprises a ring third reducer gear 33. The cycloid assembly 19 comprises a pinion first step 38 and a plurality of cycloid shafts 55. The cycloid assembly 19 is rotatably coupled to the eccentric shaft 51 about an eccentric axis 3 which is parallel to and spaced from the reducer axis 2. The first step 38 engages the third reducer gear 33 and each cycloid shaft 55 engages a cycloid race 56, thereby providing a cycloid gear.

FIGS. 34-43 illustrate respectively, a first through tenth exemplary embodiment of an anti-backlash planetary gear. Each anti-backlash planetary gear comprises a main drive assembly 11, a main driven assembly 13, and a carrier assembly 12, all co-axial with a central axis 1.

A first gear 21 and input shaft 41 are integral and combine with a bearing 60 to form the main drive assembly 11. A second gear 22 and case 40 are integral and form the main driven assembly 13. A carrier 44, an output shaft 42, and the reference assemblies 16 of all reducer assemblies 17 are integral and combine with a bearing 61 to form the carrier assembly 12.

Bearing 60 rotatably couples the main drive assembly 11 to the main driven assembly 13. Bearing 61 rotatably couples the carrier assembly 12 to the main driven assembly 13.

The first gear 21 simultaneously engages all first reducer gears 31 and the second gear 22 simultaneously engages all second reducer gears 32. Rotating the first gear 21 causes all first reducer gears 31 and drive assemblies 14 to rotate. Rotating the drive assembly 14 of each reducer assembly 17 causes the corresponding driven assembly 15 to rotate at a reduced rate. The simultaneous engagement between the second reducer gears 32 and the fixed second gear 22 causes the reducer assemblies 17 to circulate around the central axis 1 and rotate the carrier assembly 12.

Figure 38A:
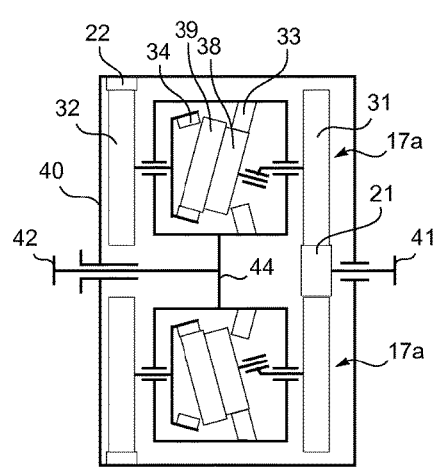
FIGS. 38A-38D depict respectively, a schematic, a cross-sectional side view, an exploded perspective view, and an additional exploded perspective view in accordance with a fifth exemplary embodiment of an anti-backlash planetary gear.
Figure 38B:
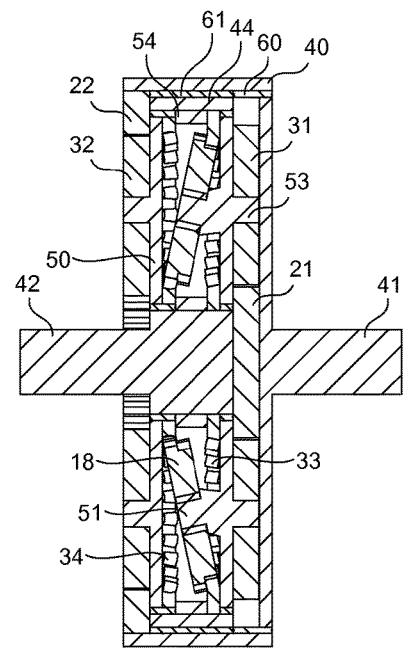
Figure 38C:
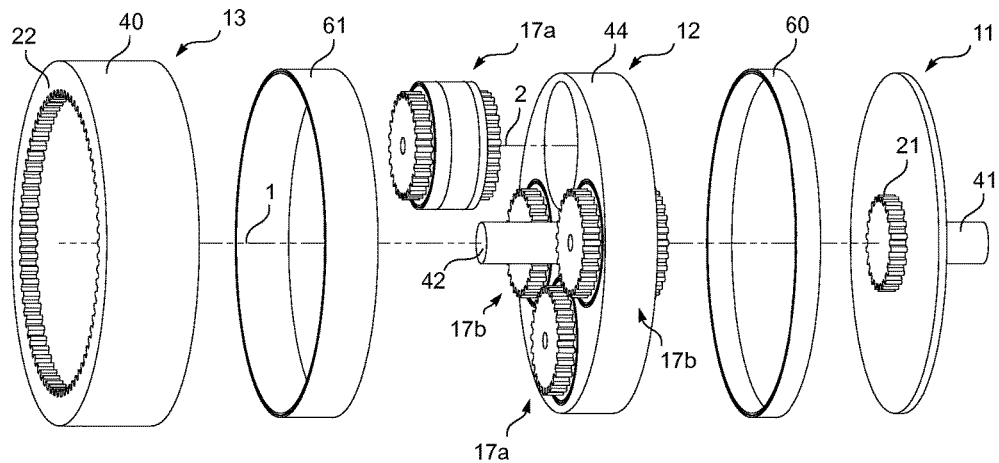
Figure 38D:
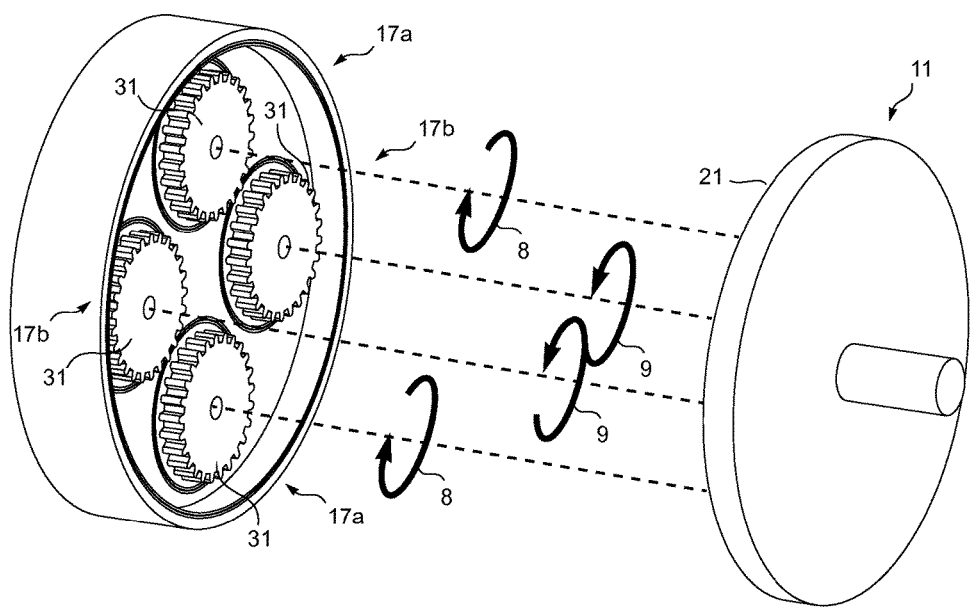

FIG. 38D illustrates the method for reducing backlash. First the first gear 21 is disengaged from the anti-backlash planetary gear. Next, the first reducer gears 31 of each reducer assembly 17a are rotated in one direction 8 while the first reducer gears 31 of each reducer assembly 17b are rotated in the opposite direction 9 until the teeth of the second reducer gears 32 of reducer assembly 17a and the teeth of the second reducer gears 32 of reducer assembly 17b come into contact with opposite sides of the teeth of second gear 22. Finally, the first gear 21 is re-engaged with the anti-backlash planetary gear. It is understood that the directions 8 and 9 could be reversed without substantially affecting the method.

For each direction of rotation of the first gear 21, half of the reducer assemblies 17 contribute to the torque applied to the second gear 22 while the others track the rotational trajectory without contributing to, or impeding the applied torque.

In the first through eighth exemplary embodiments of an anti-backlash planetary gear illustrated in FIGS. 34-41, the reducer axes 2 are substantially parallel to and spaced from the central axis 1. In the ninth and tenth exemplary embodiments of an anti-backlash planetary gear illustrated in FIGS. 42-43, the reducer axes are at an angle to one another and substantially intersect at a common point on the central axis 1.

The first through fourth exemplary embodiments of an anti-backlash planetary gear illustrated in FIGS. 34-37, each comprise six reducer assemblies 17a, 17b integral with the carrier assembly 12. Although the first exemplary embodiment of a reducer assembly 17 illustrated in FIG. 4 is depicted in FIGS. 34-37, any one of the thirty exemplary reducer assemblies 17 would suffice.

Figure 39A:
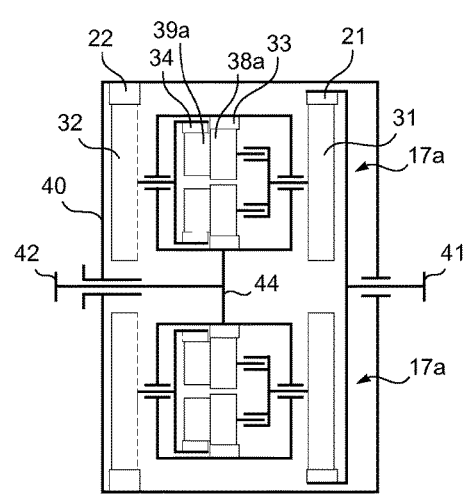
FIGS. 39A-39C depict respectively, a schematic, a cross-sectional side view, and an exploded perspective view in accordance with a sixth exemplary embodiment of an anti-backlash planetary gear.
Figure 39B:
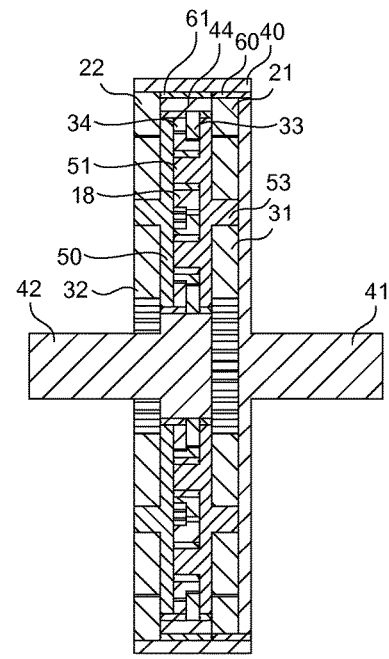
Figure 39C:
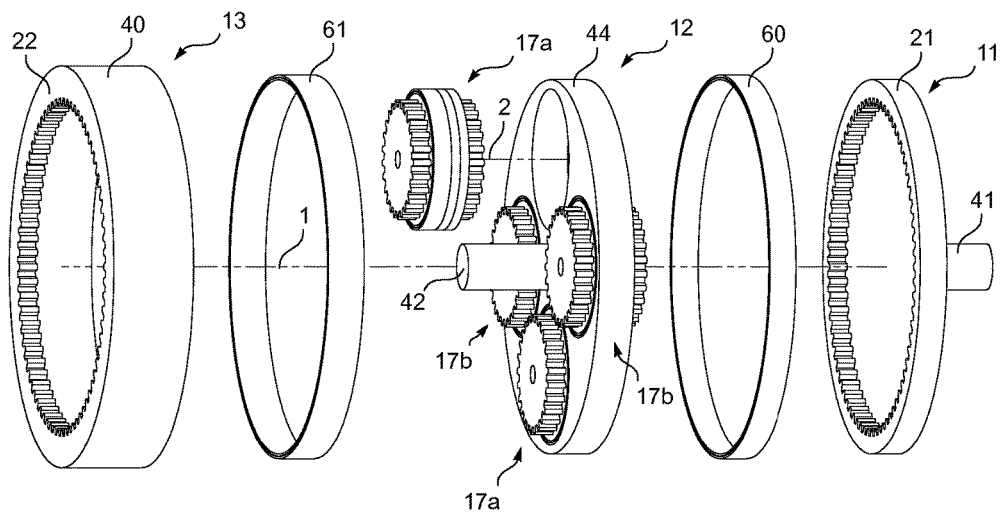
Figure 40:
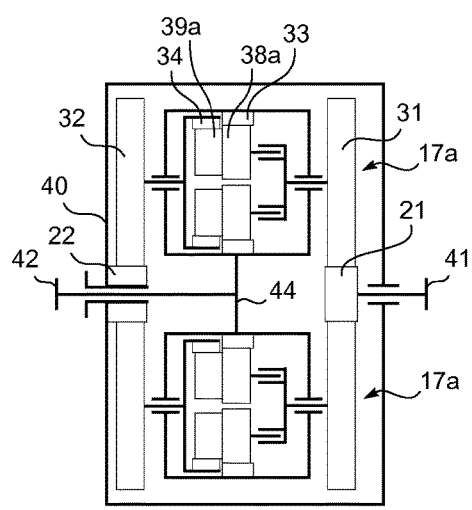
FIGS. 40-41 depict respectively, schematics in accordance with a seventh and eighth exemplary embodiment of an anti-backlash planetary gear.
Figure 41:
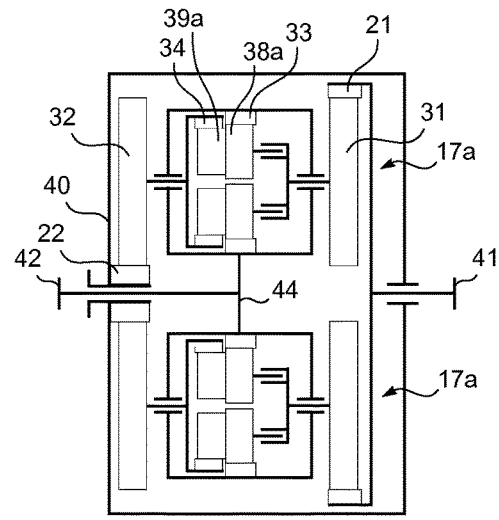

The fifth through eighth exemplary embodiments of an anti-backlash planetary gear illustrated in FIGS. 38-41, each comprise four reducer assemblies 17a, 17b integral with the carrier assembly 12. Although the thirteenth exemplary embodiment of a reducer assembly 17 illustrated in FIG. 16 is depicted in FIG. 38, and the first exemplary embodiment of a reducer assembly 17 illustrated in FIG. 4 is depicted in FIGS. 39-41, any one of the thirty exemplary reducer assemblies 17 would suffice.

The first and fifth exemplary embodiments of an anti-backlash planetary gear, illustrated in FIGS. 34 and 38 respectively, each comprise a pinion first gear 21, and a ring second gear 22.

Figure 35:
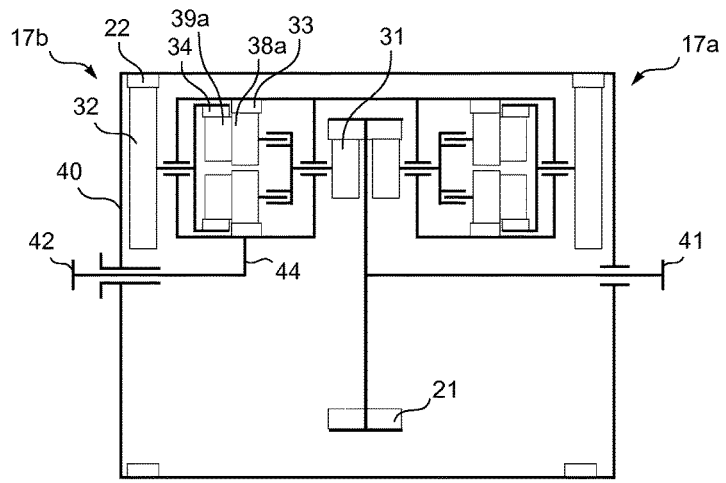
FIGS. 35-37 depict respectively, schematics in accordance with a second through fourth exemplary embodiment of an anti-backlash planetary gear.

The second and sixth exemplary embodiments of an anti-backlash planetary gear illustrated in FIGS. 35 and 39 respectively, each comprise a ring first gear 21, and a ring second gear 22.

Figure 36:
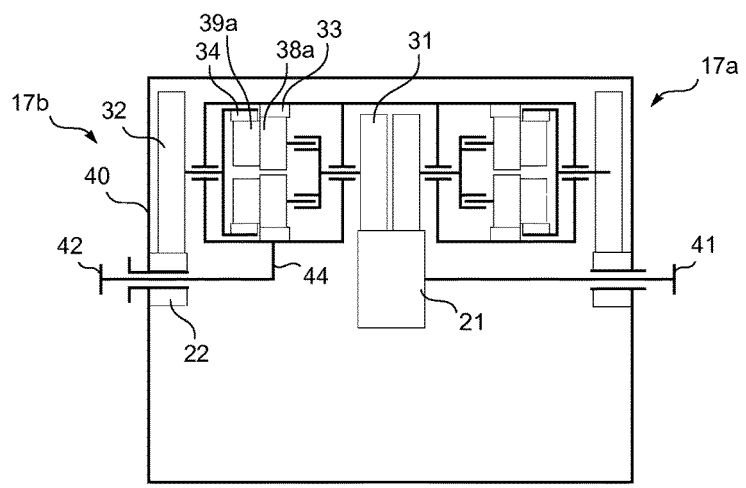

The third and seventh exemplary embodiments of an anti-backlash planetary gear illustrated in FIGS. 36 and 40 respectively, each comprise a pinion first gear 21, and a pinion second gear 22.

Figure 37:
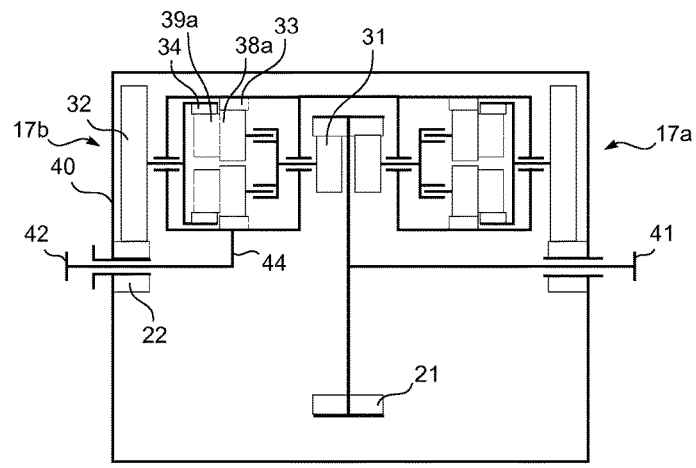

The fourth and eighth exemplary embodiments of an anti-backlash planetary gear illustrated in FIGS. 37 and 41 respectively, each comprise a ring first gear 21, and a pinion second gear 22.

Figure 42A:
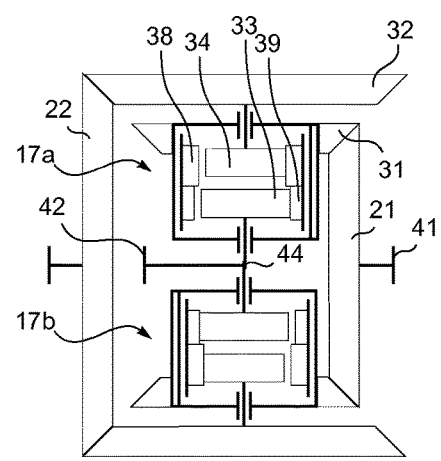

The ninth exemplary embodiment of an anti-backlash planetary gear illustrated in FIG. 42, comprises two reducer assemblies 17a, 17b integral with the carrier assembly 12. Although the eighth exemplary embodiment of a reducer assembly 17 illustrated in FIG. 11 is depicted in FIG. 42, any one of the thirty exemplary reducer assemblies 17 would suffice.

Figure 43A:
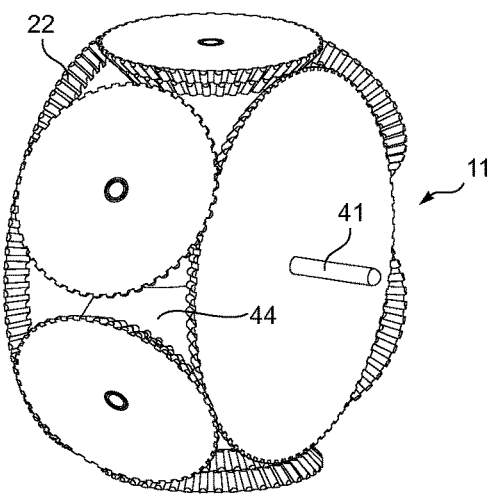
FIGS. 43A-43B depict respectively, a perspective view, and an exploded perspective view in accordance with a tenth exemplary embodiment of an anti-backlash planetary gear.
Figure 43B:
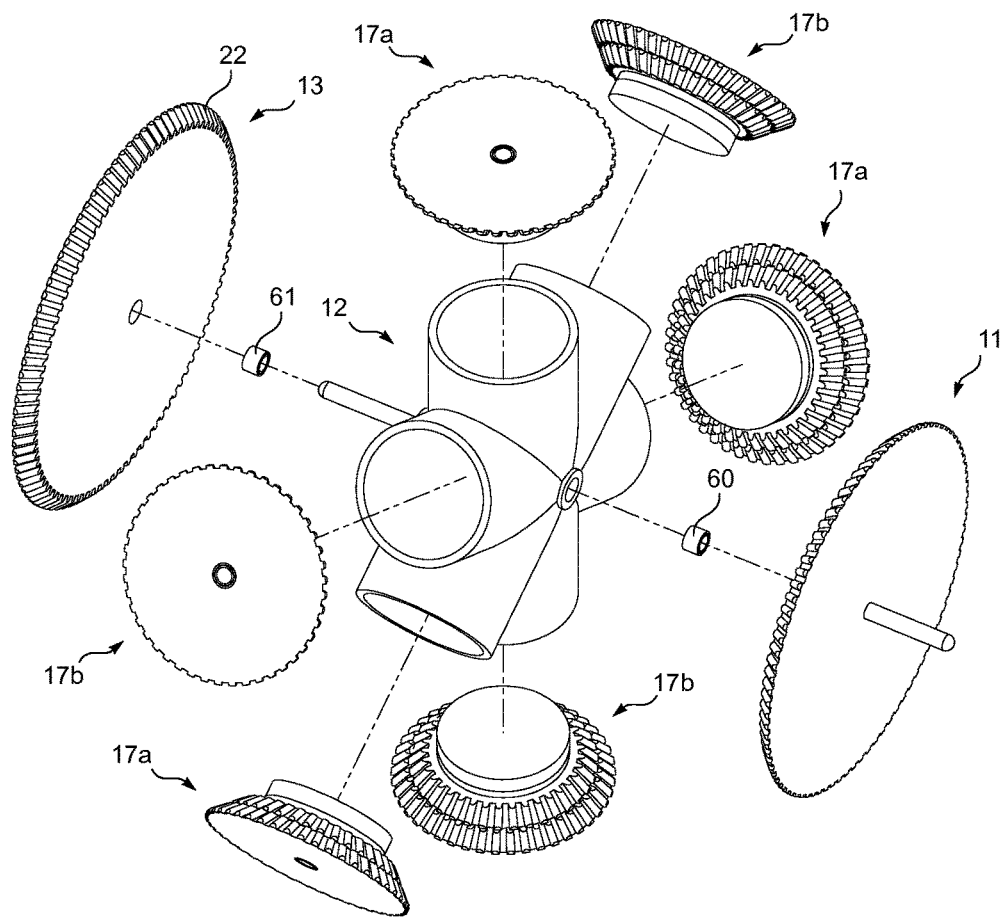

The tenth exemplary embodiment of an anti-backlash planetary gear illustrated in FIG. 43, comprises six reducer assemblies 17a, 17b integral with the carrier assembly 12. Although the eighth exemplary embodiment of a reducer assembly 17 illustrated in FIG. 11 is depicted in FIG. 43, any one of the thirty exemplary reducer assemblies 17 would suffice.

The ninth and tenth exemplary embodiments of an anti-backlash planetary gear illustrated in FIGS. 42 and 43 each comprise a bevel first gear 21, and a bevel second gear 22.

FIGS. 44-45 illustrate respectively, a first and second exemplary embodiment of an anti-backlash star gear. An anti-backlash star gear is equivalent to an anti-backlash planetary gear except for the following. An anti-backlash star gear uses the carrier assembly 12 as the reference and the main driven assembly 13 as the output. In addition, the output shaft 42 is integral with the driven assembly 13 rather than the carrier assembly 12. In addition, an anti-backlash star gear comprising two co-axial reducer assemblies 17a, 17b may be configured to comprise a plurality of driven assemblies 13, each rotating about an axis which substantially intersects, but is not necessarily co-axial with the central axis 1, as illustrated in FIG. 45.

The first and second exemplary embodiment of an anti-backlash star gear illustrated in FIGS. 44 and 45 respectively, each comprise two reducer assemblies 17a, 17b integral with the carrier assembly 12. Although the tenth exemplary embodiment of a reducer assembly 17 illustrated in FIG. 13 is depicted in FIG. 44, and the eighth exemplary embodiment of a reducer assembly 17 illustrated in FIG. 11 is depicted in FIG. 45, any one of the thirty exemplary reducer assemblies 17 would suffice.

The method for reducing backlash illustrated in FIG. 45B is similar to that described for FIG. 1D. It is understood that the directions 8 and 9 could be reversed without substantially affecting the method.

Figure 46D:
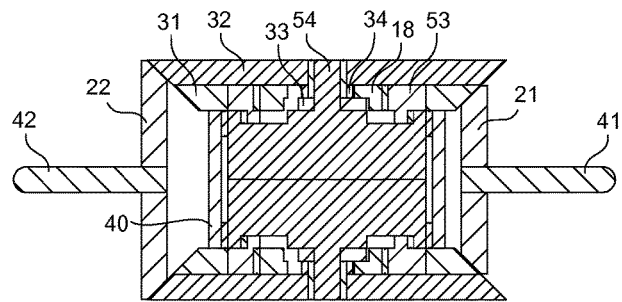

FIG. 46 illustrates a fourth exemplary embodiment of an anti-backlash assembly. The anti-backlash assembly provides a low backlash, speed reduced engagement path between a first gear 21 and a second gear 22 whereby high speed rotation of the first gear 21 results in low speed rotation of the second gear 22 with minimal free-play between the first gear 21 and the second gear 22.

The anti-backlash assembly comprises a case 40 and a pair of reducer assemblies 17a, 17b which each provide a different reduction ratio. The reducer assemblies 17a, 17b are axially aligned about a common reducer axis 2. The first gear 21 and second gear 22 each define an axis 1a, 1b, which is perpendicular to the reducer axis 2. The axes 1a and 1b may or may not be configured to be co-axial with each other. Although the eighth exemplary embodiment of a reducer assembly 17 illustrated in FIG. 11 is depicted in FIG. 46, any one of the thirty exemplary reducer assemblies 17 would suffice.

The two reference assemblies 16 are fixably connected and rotate together as a common unit. Bearing 65 rotatably couples the reference assemblies 16 to the case 40. The first gear 21 simultaneously engages both first reducer gears 31. Both second reducer gears 32 simultaneously engage the second gear 22.

Rotating the first gear 21 causes both drive assemblies 14 to rotate. The two driven assemblies 15 each rotate at a different rate due to their unequal reduction ratios. This causes the integrated reference members 54 to rotate inside the case 40 while the two second reducer gears 32 advance the second gear 22 at a lower rate than the first gear 21.

FIG. 47 illustrates a fifth exemplary embodiment of an anti-backlash assembly. The backlash reduction method is illustrated in FIG. 47F. The fifth exemplary embodiment is substantially equivalent to the fourth exemplary embodiment illustrated in FIG. 46, except for the following. In the fifth exemplary embodiment, the reducer assemblies 17a, 17b are arranged in a co-planar rather than a co-axial configuration whereby the reducer axes 2a, 2b are substantially parallel to and spaced from one another. In addition, the two first reducer gears 31 each engage the first gear 21 at a different point on the first gear 21 pitch surface. In addition, the first gear 21, second gear 22, first reducer gears 31, second reducer gears 32, and fifth reducer gears 35 are spur gears rather than bevel gears, although spur gears would suffice in either exemplary embodiment.

In addition, the reference assembly 16 of reducer assembly 17a is not fixably connected to the reference assembly 16 of reducer assembly 17b. Instead, a fifth reducer gear 35 is fixably connected to the reference member 53 of each reducer assembly 17. The fifth reducer gear 35 of reducer assembly 17a engages the fifth reducer gear 35 of reducer assembly 17b whereby the two reference assemblies counter-rotate with respect to the case 40.

FIG. 48 illustrates a sixth exemplary embodiment of an anti-backlash assembly. The backlash reduction method is illustrated in FIG. 48D. In FIG. 48A, the first gear 21 and second gear 22 are depicted as invisible members. The sixth exemplary embodiment is substantially equivalent to the fifth exemplary embodiment illustrated in FIG. 47, except for the following. In the sixth exemplary embodiment, the reducer assemblies 17a, 17b are arranged in a circumferential rather than a co-planer configuration whereby the reducer axes 2a, 2b are at an angle to one another and substantially intersect at a common point on a central axis 1. In addition, the central axis 1 is common for the first gear 21 and second gear 22 and is substantially perpendicular to the plane defined by the two reducer axes 2a, 2b. In addition, the first gear 21, second gear 22, first reducer gears 31, second reducer gears 32, and fifth reducer gears 35 are bevel gears rather than spur gears, although spur gears would suffice.

Although a fixable coupling is depicted in FIG. 46 and a pair of fifth reducer gears 35 are depicted in FIGS. 47 and 48 to rotatably engage the reference assemblies 16 of the two reduction assembles 17a, 17b, any rotatable engagement means would suffice. For example a series of gears, a chain and sprocket, or any other engagement means with any desired turn ratio would suffice.

Figure 46E:
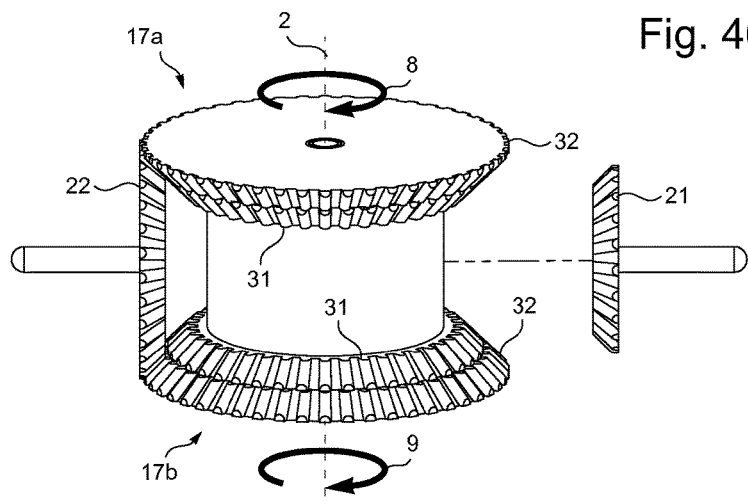
Figure 47A:
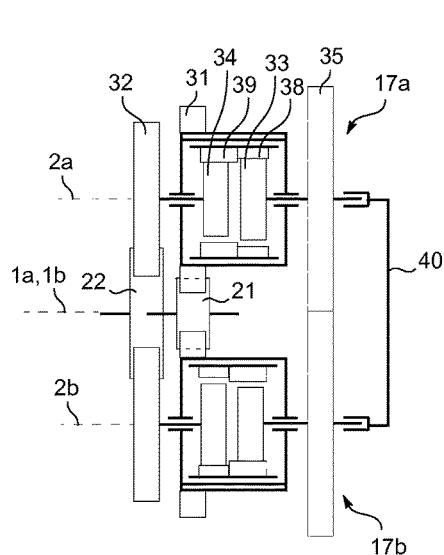
FIGS. 47A-47F depict respectively, a schematic, a perspective view, a front view, a rear view, an exploded perspective view, and an additional exploded perspective view in accordance with a fifth exemplary embodiment of an anti-backlash assembly.
Figure 47B:
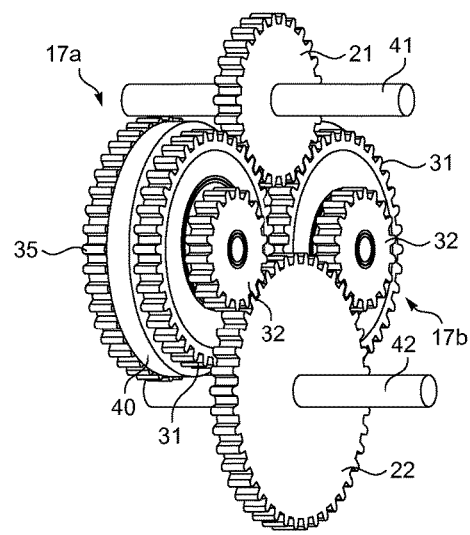
Figure 47C:
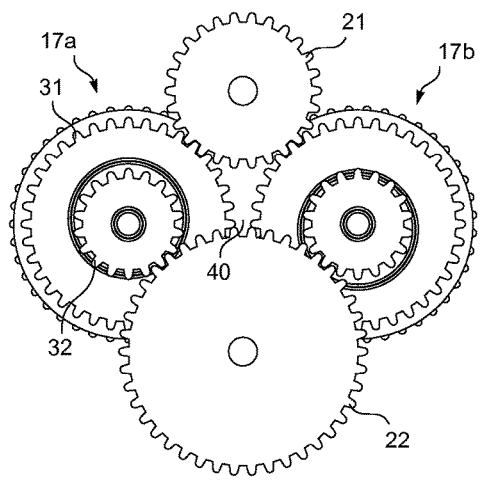
Figure 47D:
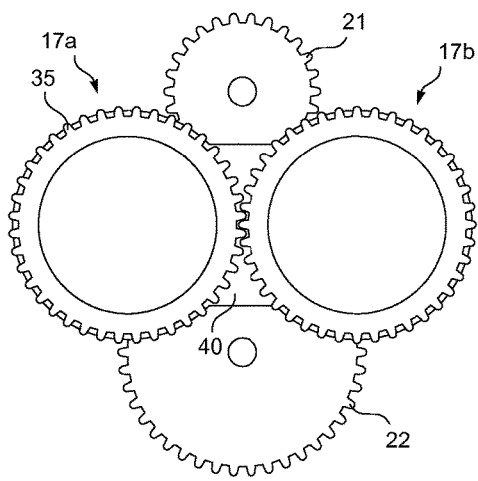
Figure 47E:
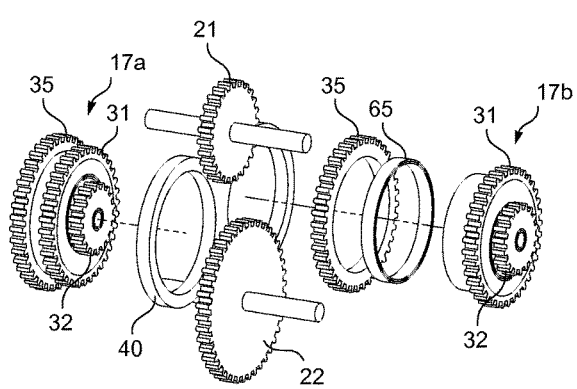
Figure 47F:
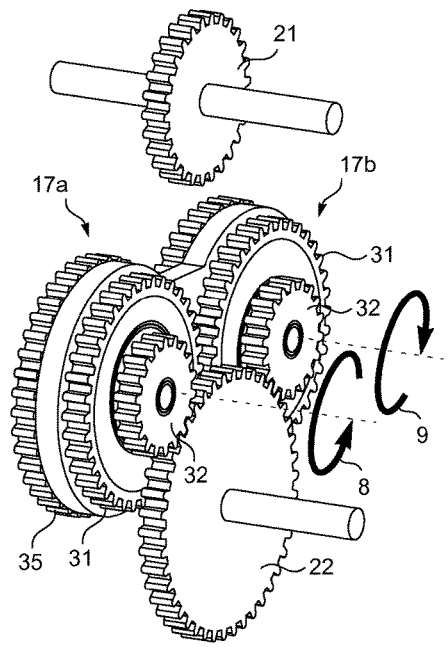
Figure 48A:
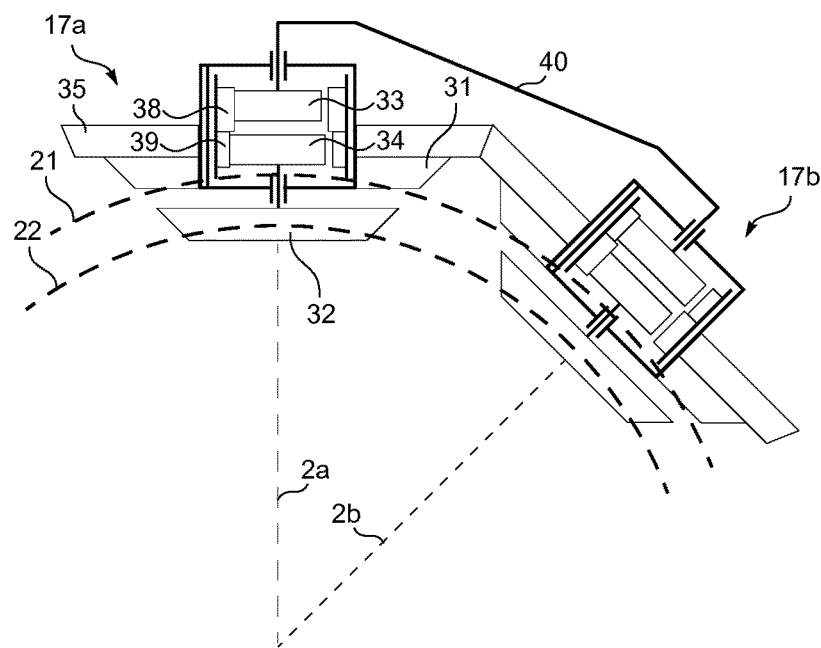
FIGS. 48A-48D depict respectively, a schematic, a perspective view, an exploded perspective view, and an additional exploded perspective view in accordance with a sixth exemplary embodiment of an anti-backlash assembly.
Figure 48B:
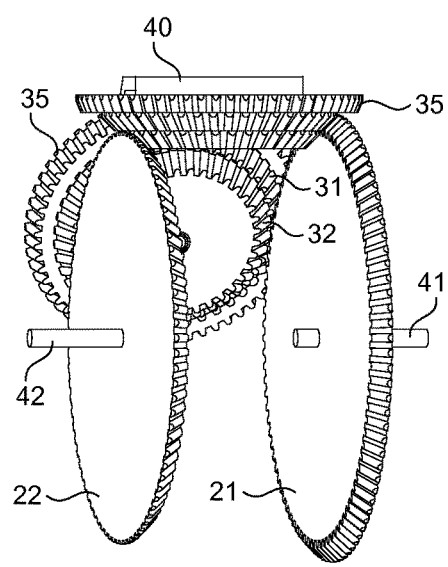
Figure 48C:
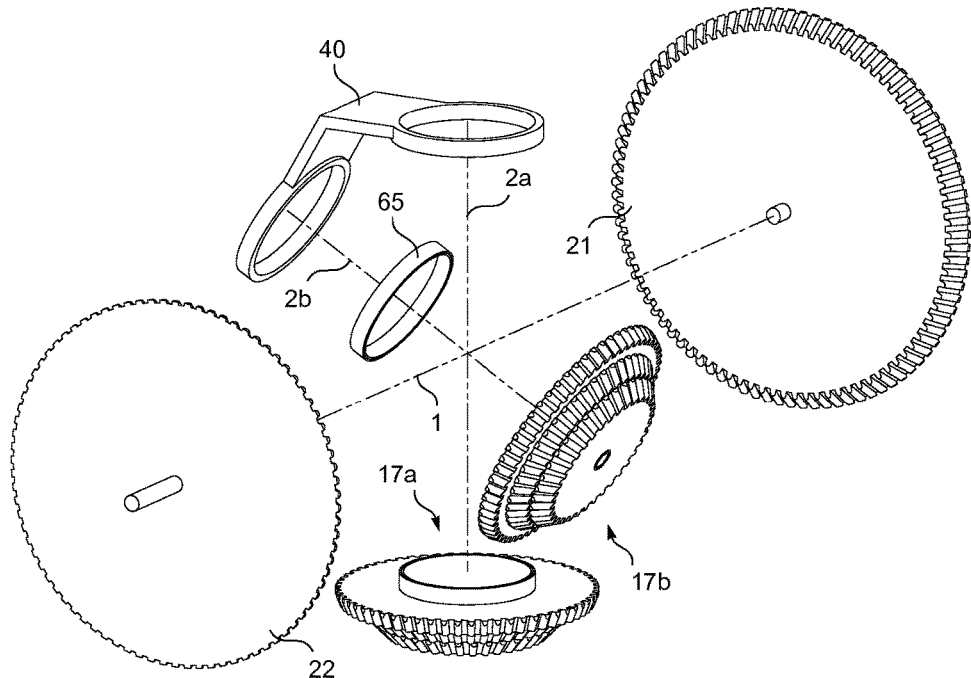
Figure 48D:
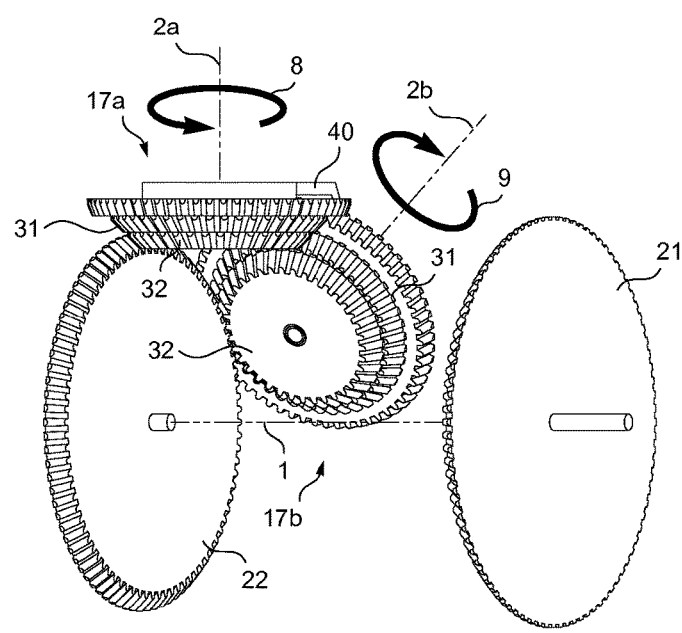
Figure 49A:
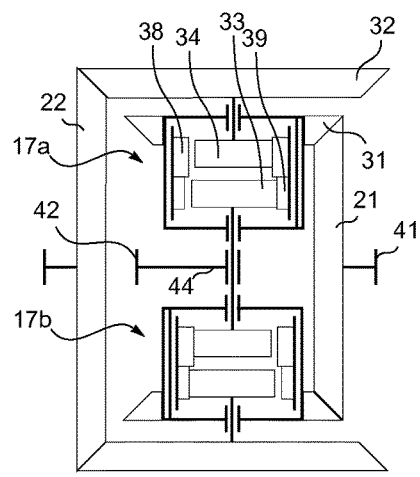
FIGS. 49A-49D depict respectively, a schematic, a perspective view, an exploded perspective view, and a cross-sectional side view in accordance with an eleventh exemplary embodiment of an anti-backlash planetary gear.
Figure 49B:
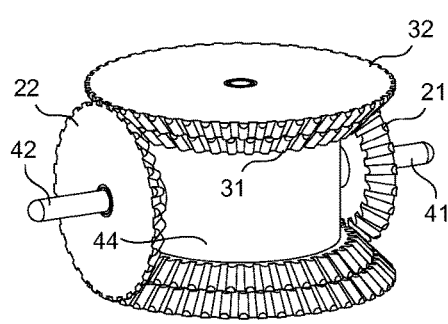
Figure 49C:
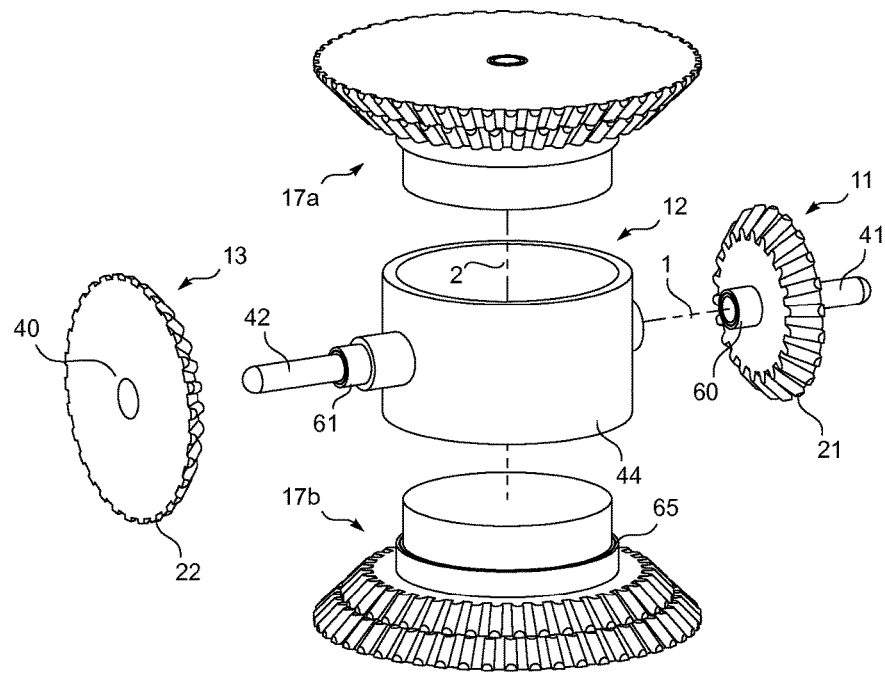
Figure 49D:
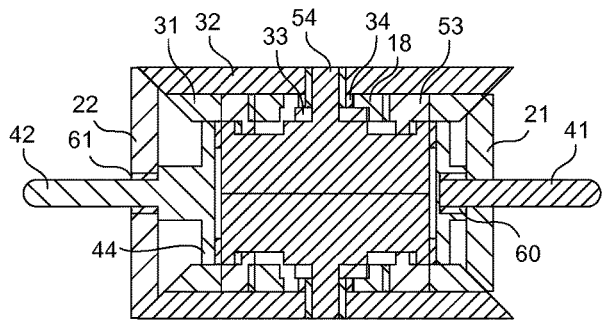

The method for reducing backlash illustrated in FIGS. 46E, 47F and 48D is similar to that described for FIG. 1D. It is understood that the directions 8 and 9 could be reversed without substantially affecting the method.

FIGS. 49-54 illustrate respectively, an eleventh through sixteenth exemplary embodiment of an anti-backlash planetary gear. Each anti-backlash planetary gear comprises a main drive assembly 11, a main driven assembly 13, and a carrier assembly 12, all co-axial with a central axis 1.

A first gear 21 and input shaft 41 are integral and combine with a bearing 60 to form the main drive assembly 11. A second gear 22 and case 40 are integral and form the main driven assembly 13. A carrier 44 and an output shaft 42 are integral and combine with a bearing 61 to form the carrier assembly 12.

Bearing 60 rotatably couples the main drive assembly 11 to the main driven assembly 13. Bearing 61 rotatably couples the carrier assembly 12 to the main driven assembly 13. Bearing 65 rotatably couples each reference assembly 16 to the carrier 44.

The first gear 21 simultaneously engages all first reducer gears 31 and the second gear 22 simultaneously engages all second reducer gears 32. Rotating the first gear 21 causes all first reducer gears 31 and drive assemblies 14 to rotate. Rotating the drive assembly 14 of each reducer assembly 17 causes the corresponding driven assembly 15 to rotate. The two driven assemblies 15 each rotate at a different rate due to their differing reduction ratios. The reference assemblies 16 each rotate inside the carrier 44 while the second reducer gears 32 advance the second gear 22 at a lower rate than the first gear 21. Fixing the second gear 22 to the case 40 causes the reducer assemblies 17 to circulate around the central axis 1 and rotate the carrier assembly 12.

Figure 50A:
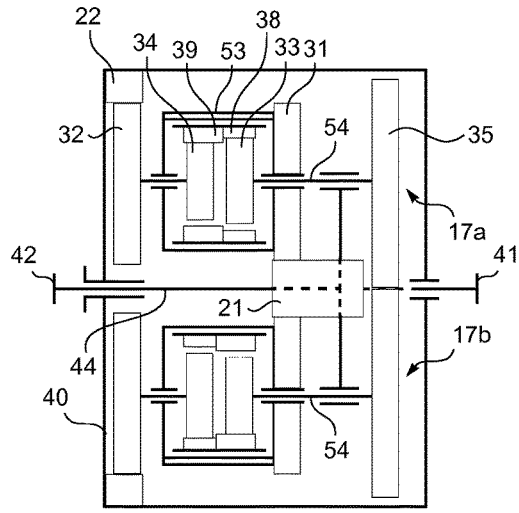

The method for reducing backlash illustrated in FIG. 50F is similar to that described for FIG. 38D. It is understood that the directions 8 and 9 could be reversed without substantially affecting the method.

In the twelfth through fifteenth exemplary embodiments of an anti-backlash planetary gear illustrated in FIGS. 50-53, the reducer axes 2 are substantially parallel to and spaced from the central axis 1. In the eleventh and sixteenth exemplary embodiments of an anti-backlash planetary gear illustrated in FIGS. 49 and 54, the reducer axes are at an angle to one another and substantially intersect at a common point on the central axis 1.

The eleventh exemplary embodiment of an anti-backlash planetary gear illustrated in FIG. 49, comprises two reducer assemblies 17a, 17b. Although the eighth exemplary embodiment of a reducer assembly 17 illustrated in FIG. 11 is depicted in FIG. 49, any one of the thirty exemplary reducer assemblies 17 would suffice.

The twelfth through fifteenth exemplary embodiments of an anti-backlash planetary gear illustrated in FIGS. 50-53, each comprise six reducer assemblies 17a, 17b. Although the eighth exemplary embodiment of a reducer assembly 17 illustrated in FIG. 11 is depicted in FIGS. 50-53, any one of the thirty exemplary reducer assemblies 17 would suffice.

The sixteenth exemplary embodiment of an anti-backlash planetary gear illustrated in FIG. 54, comprises six reducer assemblies 17a, 17b. Although the eighth exemplary embodiment of a reducer assembly 17 illustrated in FIG. 11 is depicted in FIG. 54, any one of the thirty exemplary reducer assemblies 17 would suffice.

The eleventh and sixteenth exemplary embodiments of an anti-backlash planetary gear, illustrated in FIGS. 49 and 54 respectively, each comprise a bevel first gear 21, and a bevel second gear 22.

Figure 50B:
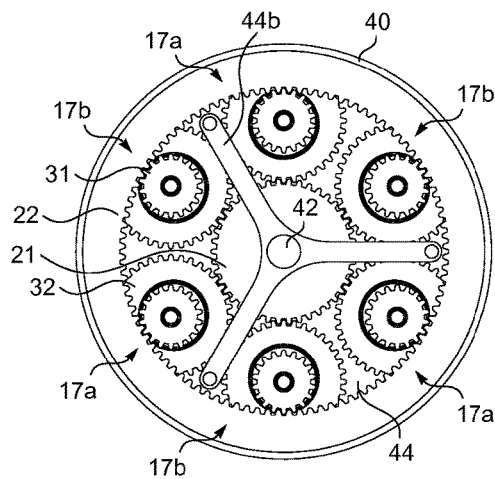
Figure 50C:
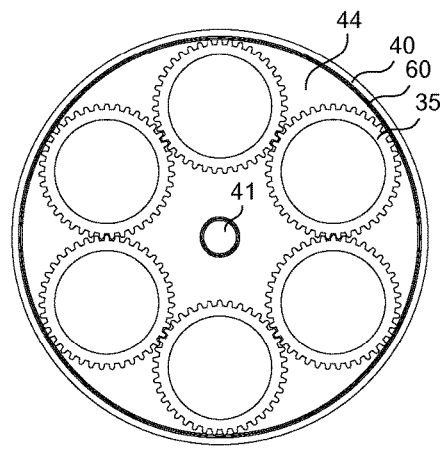

The twelfth exemplary embodiment of an anti-backlash planetary gear illustrated in FIG. 50 comprises a pinion first gear 21, and a ring second gear 22.

Figure 51:
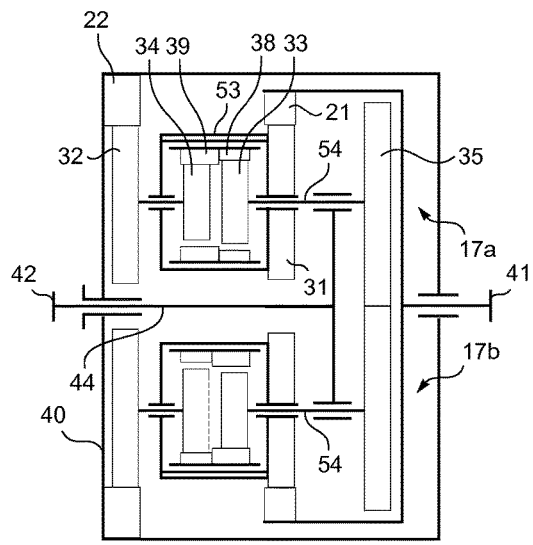
FIGS. 51-53 depict respectively, schematics in accordance with a thirteenth through fifteenth exemplary embodiment of an anti-backlash planetary gear.

The thirteenth exemplary embodiment of an anti-backlash planetary gear illustrated in FIG. 51 comprises a ring first gear 21, and a ring second gear 22.

Figure 52:
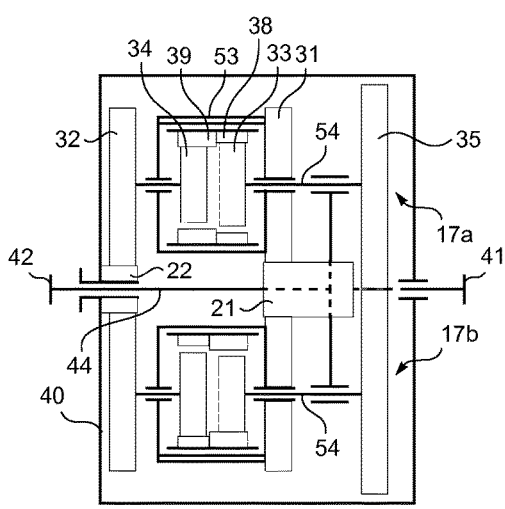

The fourteenth exemplary embodiment of an anti-backlash planetary gear illustrated in FIG. 52 comprises a pinion first gear 21, and a pinion second gear 22.

Figure 53:
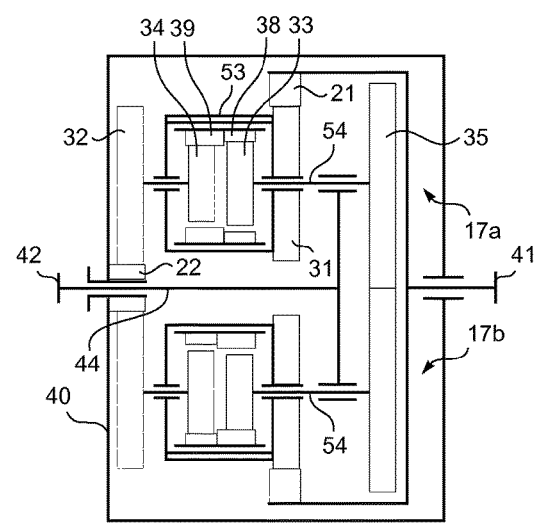

The fifteenth exemplary embodiment of an anti-backlash planetary gear illustrated in FIG. 53 comprises a ring first gear 21, and a pinion second gear 22.

FIGS. 55-56 illustrate respectively, a third and fourth exemplary embodiment of an anti-backlash star gear.

The third and fourth exemplary embodiments of an anti-backlash star gear illustrated in FIGS. 55 and 56 respectively, each comprise two reducer assemblies 17a, 17b. Although the tenth exemplary embodiment of a reducer assembly 17 illustrated in FIG. 13 is depicted in FIG. 55, and the eighth exemplary embodiment of a reducer assembly 17 illustrated in FIG. 11 is depicted in FIG. 56, any one of the thirty exemplary reducer assemblies 17 would suffice.

The two reference assemblies 16 are fixably connected and rotate together as a common unit. Bearing 65 rotatably couples the reference assemblies 16 to the case 40.

The method for reducing backlash illustrated in FIG. 56B is similar to that described for FIG. 1D. It is understood that the directions 8 and 9 could be reversed without substantially affecting the method.

In each of the following examples, the reduction ratio RR=Ti/To where Ti is the number of turns applied to the input shaft 41 and To is the number of turns resulting at the output shaft 42, all with respect to the rotational reference, which is the case 40 for an anti-backlash assembly, the main driven assembly 13 for an anti-backlash planetary gear, and the carrier assembly 12 for an anti-backlash star gear. The reducer ratio Nx=Tix/Tox where Tix is the number of turns applied to the first reducer gear 31 and Tox is the number of turns resulting at the second reducer gear 32, all with respect to the reference assembly 16. The "x" subscript is used to indicate values for a particular collection of reducer assemblies 17. For example, Na, Tia and To a correspond to reducer assemblies 17a and Nb, Tib, and Tob correspond to reducer assemblies 17b. The "x" subscript is absent when N, Ti and To are common for all reducer assemblies 17.

RR and Nx are computed from P21, P22, P31, P32, P33, P34, P38 and P39 which are the pitch diameters of the first gear 21, second gear 22, first reducer gear 31, second reducer gear 32, third reducer gear 33, fourth reducer gear 34, first step 38 and second step 39 respectively. A positive value indicates that the input and output turn in the same direction and a negative value indicates that they turn in opposite directions.

Each example involves reducer assemblies 17 that are either orbit gears or nutating gears so Nx is computed as follows.

$$N_x = \frac{P_{34}P_{38}}{P_{34}P_{38} - P_{33}P_{39}}$$

For the first exemplary embodiment of an anti-backlash assembly, RR is computed as follows.

$$RR = N\frac{P_{22}P_{31}}{P_{21}P_{32}}$$

For the fourth and fifth exemplary embodiments of an anti-backlash assembly, RR is computed as follows.

$$RR = \left(\frac{2N_aN_b - (N_a + N_b)}{N_a + N_b - 2}\right)\left(\frac{P_{22}P_{31}}{P_{21}P_{32}}\right)$$

For the fifth, sixth and ninth exemplary embodiments of an anti-backlash planetary gear, RR is computed as follows where the sign of RR depends on whether the first gear 21 and the second gear 22 are ring or pinion gears.

$$RR = \pm N\left(1 + \frac{P_{22}P_{31}}{P_{21}P_{32}}\right)$$

For the eleventh and twelfth exemplary embodiments of an anti-backlash planetary gear, RR is computed as follows where the sign of RR depends on whether the first gear 21 and the second gear 22 are ring or pinion gears.

$$RR = \pm\left(\frac{2N_aN_b - (N_a + N_b)}{N_a + N_b - 2}\right)\left(1 + \frac{P_{22}P_{31}}{P_{21}P_{32}}\right)$$

For the second exemplary embodiment of an anti-backlash star gear, RR is computed as follows.

$$RR = -N\frac{P_{22}P_{31}}{P_{21}P_{32}}$$

For the fourth exemplary embodiment of an anti-backlash star gear, RR is computed as follows.

$$RR = -\left(\frac{2N_aN_b - (N_a + N_b)}{N_a + N_b - 2}\right)\left(\frac{P_{22}P_{31}}{P_{21}P_{32}}\right)$$

When performing the backlash reduction method, after disengaging the first gear 21, each first reducer gear 31 must be advanced by an integer number of gear teeth or it will not be possible to re-engage the first gear 21. The backlash reduction ratio Δ corresponds to the number of first reducer gear 31 teeth that must be advanced in order to advance the second reducer gear 32 by a single tooth. Advancing the first reducer gear by a single tooth causes the second reducer gear 32 to advance by 1/Δ of a tooth so a large Δ value is desirable because it allows backlash to be removed in smaller increments. Δ is computed as follows, assuming all associated gears have an equivalent tooth module.

In the first through seventh examples, Δ is computed as follows.

$$\Delta = \left|N\frac{P_{31}}{P_{32}}\right|$$

In the eighth through twelfth examples, Δ is computed as follows.

$$\Delta = \left|\left(\frac{N_b(N_a - 1)}{N_b - 1}\right)\left(\frac{P_{31}}{P_{32}}\right)\right|$$

A first example considers the first exemplary embodiment of an anti-backlash assembly illustrated in FIG. 1. The reducer gears 17 are orbit gears. The values P21=24, P22=42, P31=36, P32=18, P33=11, P34=10, P38=13 and P39=12 result in N=−65 RR=−228, and Δ=130.

A second example considers the fifth exemplary embodiment of an anti-backlash planetary gear illustrated in FIG. 38. The reducer gears 17 are nutating gears and P38>P33 and P39>P34 to avoid mechanical interference. The values P21=22, P22=72, P31=P32=25, P33=21, P34=22, P38=22 and P39=23 result in N=484, RR=−2,068 and Δ=484.

A third example considers the sixth exemplary embodiment of an anti-backlash planetary gear illustrated in FIG. 39. The reducer gears 17 are counterbalanced orbit gears and P38<P33/2 and P39<P34/2 to avoid mechanical interference. The values P21=P22=72, P31=P32=25, P33=24, P34=23, P38=11 and P39=10 result in N=19, RR=39 and Δ=19.5.

A fourth example considers the sixth exemplary embodiment of an anti-backlash planetary gear illustrated in FIG. 39 with the reducer assemblies 17 replaced by the second exemplary embodiment of a reducer assembly 17 illustrated in FIG. 5. The reducer gears 17 are counterbalanced orbit gears with overlapping stepped gear assembly 18. The values P21=P22=72, P31=P32=25, P33=24, P34=23, P38=13 and P39=12 result in N=27, RR=54 and Δ=27.2.

A fifth example considers the sixth exemplary embodiment of an anti-backlash planetary gear illustrated in FIG. 39 with the reducer assemblies 17 replaced by the eighth exemplary embodiment of a reducer assembly 17 illustrated in FIG. 11. The reducer gears 17 are orbit gears and P38<P33 and P39<P34 to avoid mechanical interference. The values P21=P22=72, P31=P32=25, P33=24, P34=23, P38=15 and P39=14 result in N=38, RR=77 and Δ=38.3.

A sixth example considers the ninth exemplary embodiment of an anti-backlash planetary gear illustrated in FIG. 42. The reducer gears 17 are orbit gears. The values P21=22, P22=30, P31=37, P32=45, P33=11, P34=10, P38=13 and P39=12 result in N=−65 RR=−138, and Δ=53.4.

A seventh example considers the second exemplary embodiment of an anti-backlash star gear illustrated in FIG. 45. The reducer gears 17 are orbit gears. The values P21=22, P22=30, P31=37, P32=45, P33=11, P34=10, P38=13 and P39=12 result in N=−65 RR=73, and Δ=53.4.

In the following examples, the pitch diameters of all fifth reducer gears 35 are equal, making the following equations independent of the associated pitch diameters. It is also understood that different reduction ratios may be achieved by making the pitch diameter of the fifth reduction gear 35 of reducer assembly 17a unequal to the pitch diameter of the fifth reduction gear 35 of reducer assembly 17b.

An eighth example considers the fourth exemplary embodiment of an anti-backlash assembly illustrated in FIG. 46. The values P21=22, P22=30, P31=42, P32=50, P33a=11, P34a=10, P38a=13, P39a=12, P33b=10, P34b=11, P38b=12 and P39b=13 result in RR=9,829 and Δ=56.3.

A ninth example considers the fifth exemplary embodiment of an anti-backlash assembly illustrated in FIG. 47. The values P21=26, P22=42, P31=36, P32=18, P33a=11, P34a=10, P38a=13, P39a=12, P33b=10, P34b=11, P38b=12 and P39b=13 result in RR=27,723 and Δ=134.

A tenth example considers the eleventh exemplary embodiment of an anti-backlash planetary gear illustrated in FIG. 49. The values P21=22, P22=30, P31=42, P32=50, P33a=11, P34a=10, P38a=13, P39a=12, P33b=10, P34b=11, P38b=12 and P39b=13 result in RR=18,410 and Δ=56.3.

An eleventh example considers the twelfth exemplary embodiment of an anti-backlash planetary gear illustrated in FIG. 50. The values P21=42, P22=96, P31=36, P32=18, P33a=11, P34a=10, P38a=13, P39a=12, P33b=10, P34b=11, P38b=12 and P39b=13 result in RR=47,808 and Δ=134.

A twelfth example considers the fourth exemplary embodiment of an anti-backlash star gear illustrated in FIG. 56. The values P21=22, P22=30, P31=42, P32=50, P33a=11, P34a=10, P38a=13, P39a=12, P33b=10, P34b=11, P38b=12 and P39b=13 result in RR=−9,829 and Δ=56.3.

The exemplary embodiments disclosed herein have a number of advantageous properties. Certain exemplary embodiments have backlash that may be adjusted during assembly or at any time thereafter to compensate for manufacturing error, manufacturing tolerances and wear and tear.

Certain exemplary embodiments may be produced with additional clearance between gear teeth to allow higher gear ratios without increased backlash.

Certain exemplary embodiments provide a high reduction ratio for a given envelope, using moderately sized gears comprising moderate numbers of teeth which are easy to manufacture and have favorable wear properties.

Certain exemplary embodiments provide a reduction ratio that scales favorably with the outside diameter.

Certain exemplary embodiments comprise ring and pinion gears which have high contact ratios and high torque capacities.

Certain exemplary embodiments may be configured such that the input and output shafts turn in the same or in opposite directions.

Certain exemplary embodiments may comprise spur gears, helical gears, double helical gears, herring-bone gears, roller tooth gears, conical gears, radial gears, or gears with any other tooth geometry.

Certain exemplary embodiments may comprise friction couplings, magnetic couplings, ratchet wheels, or any other type of engaging members.

Certain exemplary embodiments provide a non-compliant, bi-directional coupling between the input and output shafts.

Other advantages are apparent from the disclosure herein.

The invention claimed is:

1. An apparatus comprising:
   a first gear (21), a second gear (22), a case (40), a first reducer assembly (17a), and a second reducer assembly (17b);
   each reducer assembly (17a, 17b) comprises:
   a reference member (54) defining a reducer axis (2);
   a first reducer gear (31) which is co-axial with the corresponding reducer axis (2) and engages the first gear (21);
   and a second reducer gear (32) which is co-axial with the corresponding reducer axis (2) and engages the second gear (22);
   wherein the first reducer assembly (17a) provides a first reduction ratio and the second reducer assembly (17b) provides a second reduction ratio where each reduction ratio is the corresponding number of first reducer gear (31) turns divided by the number of corresponding second (32) reducer gear turns; and wherein the reference member of the first reducer assembly and the reference member of the second reducer assembly are connected to each other by a plurality of posts.

2. The apparatus of claim 1 wherein the first gear (21) and second gear (22) are co-axial.

3. The apparatus of claim 2 wherein all first and second reducer axes (2) are parallel and arranged circumferentially around the first gear (21).

4. The apparatus of claim 1 wherein the reference members (54) of the first and second reducer assemblies (17a, 17b) and the case (40) are all integral and the first and second reduction ratio are equal.

5. The apparatus of claim 1 wherein:
   each reducer assembly (17a, 17b) further comprises a fifth reducer gear (35);
   the reducer axis (2), first reducer gear (31), second reducer gear (32) and fifth reducer gear (35) of each reducer assembly (17a, 17b) are all co-axial;
   the case (40) and each reference member (54) are rotatably coupled about the corresponding reducer axis (2);
   the fifth reducer gear (32) of the first and second reducer assemblies (17a, 17b) are engaged;
   and the first and second reduction ratio are unequal.

6. The apparatus of claim 1 wherein all reducer axes (2) are at an angle to one another and intersect at a common point.

7. An apparatus comprising:
   a first gear (21), a second gear (22), a case (40), a first reducer assembly (17a), and a second reducer assembly (17b);
   each reducer assembly (17a, 17b) comprises:
   a reference member (54) defining a reducer axis (2) which is rotatably coupled to the case (40) about the corresponding reducer axis (2);
   a first reducer gear (31) which is co-axial with the corresponding reducer axis (2) and engages the first gear (21);
   a second reducer gear (32) which is co-axial with the corresponding reducer axis (2) and engages the second gear (22);

and a fifth reducer gear (35) which is co-axial with the corresponding reducer axis (2) and is integral with the reference member (54);

wherein:

the fifth reducer gear (32) of the first reducer assembly (17*a*) and the fifth reducer gear (32) of the second reducer assembly (17*b*) are engaged;

the first reducer assembly (17*a*) provides a first reduction ratio and the second reducer assembly (17*b*) provides a second reduction ratio where each reduction ratio is the corresponding number of first reducer gear (31) turns divided by the number of corresponding second (32) reducer gear turns;

the first and second reduction ratio are unequal; and wherein the reference member of the first reducer assembly and the reference member of the second reducer assembly are connected to each other by a plurality of posts.

8. The apparatus of claim 7 wherein the first gear (21) and second gear (22) are co-axial.

9. The apparatus of claim 8 wherein all first and second reducer axes (2) are parallel and arranged circumferentially around the first gear (21).

10. The apparatus of claim 7 wherein all first and second reducer axes (2) are co-axial.

11. The apparatus of claim 7 wherein all reducer axes (2) are at an angle to one another and intersect at a common point.

12. A method comprising:

providing a first gear (21), a second gear (22), a case (40), a first reducer assembly (17*a*), and a second reducer assembly (17*b*);

providing each reducer assembly (17*a*, 17*b*) with:

a reference member (54) defining a reducer axis (2) which is rotatably coupled to the case (40) about the corresponding reducer axis (2);

a first reducer gear (31) which is co-axial with the corresponding reducer axis (2) and engages the first gear (21);

a second reducer gear (32) which is co-axial with the corresponding reducer axis (2) and engages the second gear (22);

and a fifth reducer gear (35) which is co-axial with the corresponding reducer axis (2) and is integral with the reference member (54);

wherein:

the fifth reducer gear (32) of the first reducer assembly (17*a*) and the fifth reducer gear (32) of the second reducer assembly (17*b*) are engaged;

the first reducer assembly (17*a*) is configured to provide a first reduction ratio and the second reducer assembly (17*b*) is configured to provide a second reduction ratio where each reduction ratio is the corresponding number of first reducer gear (31) turns divided by the number of corresponding second (32) reducer gear turns;

the first and second reduction ratios are configured to be unequal; and wherein the reference member of the first reducer assembly and the reference member of the second reducer assembly are connected to each other by a plurality of posts.

13. The method of claim 12 wherein the first gear (21) and second gear (22) are located such that they are co-axial.

14. The method of claim 13 wherein all first and second reducer axes (2) are located such that they are parallel and arranged circumferentially around the first gear (21).

15. The method of claim 12 wherein all first and second reducer axes (2) are located such that they are co-axial.

16. The method of claim 12 wherein all reducer axes (2) are located such that all reducer axes (2) are at an angle to one another and intersect at a common point.

* * * * *